United States Patent [19]
Ishiguro et al.

[11] Patent Number: 5,940,428
[45] Date of Patent: Aug. 17, 1999

[54] SPREAD SPECTRUM SIGNAL RECEIVING APPARATUS

[75] Inventors: Kazuhisa Ishiguro, Gunma-ken; Hiroyasu Yoshida, Ota; Yoshiaki Takahashi, Gunma-ken, all of Japan

[73] Assignee: Sanyo Electric Co., Ltd., Osaka, Japan

[21] Appl. No.: 08/621,822

[22] Filed: Mar. 22, 1996

[30]    Foreign Application Priority Data

| Mar. 27, 1995 | [JP] | Japan | 7-068263 |
| Mar. 30, 1995 | [JP] | Japan | 7-073972 |
| Mar. 30, 1995 | [JP] | Japan | 7-073973 |
| Mar. 30, 1995 | [JP] | Japan | 7-073974 |

[51] Int. Cl.$^6$ ................................................ H04R 15/00
[52] U.S. Cl. ..................... 375/200; 375/201; 375/206; 375/208; 370/342
[58] Field of Search ................................ 375/200, 206, 375/208, 367, 343, 202; 370/342, 335, 209, 320; 380/34

[56]           References Cited

U.S. PATENT DOCUMENTS

| 5,031,191 | 7/1991 | Hiramatsu et al. | 375/200 |
| 5,140,610 | 8/1992 | Holliday et al. | 375/201 |
| 5,241,562 | 8/1993 | Partyka et al. | 375/206 |
| 5,301,206 | 4/1994 | Ishigaki et al. | 375/200 |
| 5,420,850 | 5/1995 | Umeda et al. | 370/342 |

*Primary Examiner*—Stephen Chin
*Assistant Examiner*—Shuwang Liu
*Attorney, Agent, or Firm*—Loeb & Loeb LLP

[57]           ABSTRACT

A received spread spectrum signal is despread by a first despreading circuit, and according to this first despread signal, a synchronizing signal generator (PLL) generates a signal in phase with the first despread signal. According to the output signal from the synchronizing signal generator, a spreading code generator generates a plurality of Spreading codes out of phase with one another. The plurality of spreading codes are supplied to a second despreading circuit, which despreads the received spread spectrum signal by the plurality of spreading codes, and thus, a plurality of second despread signals are obtained. A correlation detector detects the correlation between the spread spectrum signal and each of the plurality of spreading codes on the basis of the plurality of second despread signals. According to the correlation results, a control circuit determines the direction in which to shift the phase of the plurality of spreading codes with respect to the received spread spectrum signal. The control circuit sequentially shifts the phases of the spreading codes until a spreading code with an optimum phase is obtained which is then supplied to the first despreading circuit and maintained. In this way, a spreading code with an optimum phase is used in the first despreading circuit, and the spread spectrum signal is despread to the original bandwidth accurately.

47 Claims, 15 Drawing Sheets

DATA SHOWING CORRELATION (a)

(b) 
(c) 
(d) 
(e)

(f) 
(g) 
(h) 
(i)

SPREAD SPECTRUM SIGNAL RECEIVING APPARATUS

BACKGROUND OF THE INVENTION

1. Field of the Invention

The present invention relates to a direct spread type, spread spectrum signal receiving apparatus, and more particularly, to a spread spectrum signal receiving apparatus which prevents a phase error between a PN (pseudonoise) code on the transmitter side and a PN on the receiver side when a phase locked loop is used to acquire and maintain synchronism.

2. Description of the Prior Art

As a type of radio communication system, the spread spectrum communication system is widely known. In this spread spectrum system, the transmitter side modulates the carrier by an information signal, such as an audio signal or data, and the modulated carrier by the information signal is then multiplied by a spreading code such as an M-sequence or the like to produce a spread spectrum signal. The spread spectrum signal is transmitted from an antenna. The receiver side despreads the received spread spectrum signal by multiplying it by the same spreading code which was used on the transmitter side. The despread signal is then demodulated to obtain the original information signal.

In spread spectrum communication systems, as described above, when despreading the received spread spectrum signal, it is necessary to synchronize the spreading code generated on the receiver side and the spreading code contained in the received signal. Accordingly, a spread spectrum signal receiving apparatus designed to maintain synchronization between the spreading code generated on the receiver side and the spreading code in the received signal has been proposed.

In FIG. 1, the spread spectrum signal is changed by a frequency converter 1 to a low frequency bandwidth for ease of processing in the subsequent circuits, then the spread spectrum signal is multiplied by a spreading code, generated by a spreading code generator 3, in a multiplier 2. The phase of the output signal of the multiplier 2 is compared, by a phase comparator 4, with the phase of the output signal of a VCXO (voltage-controlled crystal oscillator) 5. The output signal of the phase comparator 4 is smoothed by an LPF 6, then applied as a control signal to the VCXO 5, so that the oscillation frequency of the VCXO 5 is varied according to the control signal. While supplying its output signal to the phase comparator 4, the VCXO 5 also supplies its output signal, through a frequency divider 7, to the spreading code generator 3. Those circuits, that is to say, the phase comparator 4, the LPF 6, the VCXO 5, constitute a so-called PLL (phase-locked loop), and the PLL operates such that the phase difference of the two input signals to the phase comparator is held at zero. According to changes in the oscillation frequency of the VCXO 5, the PLL operates to synchronize the phases of the two input signals to the phase comparator 4, and as a result the phase of the output signal of the multiplier 2 and the phase of the output signal of the VCXO 5 are synchronized.

After the phase has been locked by the PLL, a spreading code which is in phase with the spread spectrum signal is generated, and the spread spectrum signal is despread as the spread spectrum signal is multiplied by the spreading code in the multiplier 2. The output signal of the multiplier 2, derived from despreading, is applied through a BPF 8 to a demodulator 9, which demodulates to obtain the information signal.

In FIG. 1, the PLL operates to synchronize the two input signals to the phase comparator 4, so that the phase difference between the output signal of the multiplier 2 and the output signal of the VCXO 5 becomes zero. However, in actuality, due to delays in the circuit devices in FIG. 1 or otherwise, the phase of the spreading code generated on the receiver side and the phase of the spreading code in the spread spectrum signal do not precisely coincide with each other, and therefore despreading is not always accurate. This problem is referred to as step-out.

SUMMARY OF THE INVENTION

The present invention has as its object to provide a spread spectrum signal receiving apparatus which is capable of reducing the spreading code's step-out of synchronization with the spread spectrum signal from more than one bit to less than one bit, acquiring synchronization accurately even when the spreading code is less than one bit out of phase with the spread spectrum signal, and despreading the spread spectrum signal accurately.

In order to achieve the above object, a spread spectrum signal receiving apparatus according to the present invention can have the following aspects.

A spread spectrum signal receiving apparatus according to a first aspect of the present invention comprises: a first despreading circuit for despreading a received spread spectrum signal; a synchronizing signal generator for generating a signal synchronized with the phase of the first despread signal output by the first despreading circuit; a spreading code generator for generating a spreading code for despreading the received spread spectrum signal, the spreading code generator generating a plurality of spreading codes out of phase with one another according to the output signal of the synchronizing signal generator; a second despreading circuit for despreading the received spread spectrum signal using the plurality of spreading codes generated by the spreading code generator; a correlation detector for detecting the correlation between the received spread spectrum signal and each of the plurality of spreading codes according to a second despread signal output by the second despreading circuit; and a control circuit for shifting the phases of the spreading codes generated by the spreading code generator according to the ouput signal (i.e. the correlation detection signal) from the correlation detector.

In the arrangement described above, the spreading code generator first generates a plurality of spreading codes out of phase with one another according to the output signal from the synchronizing signal generator. The plurality of spreading codes are supplied to the second despreading circuit to obtain a plurality of second despread signals having different levels of correlation. The correlation detector detects the correlation between the spread spectrum signal and each of the plurality of spreading codes based on the second despread signals. Thus, it is possible to detect the direction of the change required to correlate between the received spread spectrum signal and each of the plurality of spreading codes. The control circuit controls the phase of the spreading codes by shifting it sequentially until a correlation detection signal (an output signal) from the correlation detector reaches an adequate value. Therefore, by using a spreading code, with a phase in which an optimum correlation can be attained, in the first despreading circuit an accurately despread signal can be obtained.

In the above arrangement, according to an output signal from the synchronizing signal generator, the spreading code generator generates a first spreading code and at least either of a second spreading code leading upon the phase of the first spreading code or a third spreading code lagging upon the phase of the first spreading code.

Further, the correlation detector includes a level detector for detecting the signal level of the second despread signal output from the second despreading circuit, and a holding circuit for holding the level detection signal from the level detector.

Further, the level detection signal holding circuit may be formed by, for example, capacitors or alternatively, by an A-D converter for converting the level detection signal into digital data, and memory for holding the data output from the A-D converter.

Further, the level detector detects the maximum or minimum value of the signal level of the second despread signal from the second de-spreading circuit.

The spread spectrum signal receiving apparatus further comprises a spreading code selector for selectively supplying a plurality of spreading codes output from the spreading code generator to the second despreading circuit, the spreading code selector being controlled as to be switchable over from one spreading code to another by the control circuit.

Further, the holding circuit includes a first holding circuit and a second holding circuit, the first holding circuit holds a level detection signal from the level detector according to the first spreading code, and the second holding circuit selectively holds a level detection signal from the level detector according to the second or third spreading code. The control circuit compares the output signals from the first and second holding circuits, and shifts the phase of the spreading code generated by the spreading code generator. This apparatus allows the spread spectrum signal to be despread accurately.

When the control circuit compares the output signal from the first holding circuit and the output signal from the second holding circuit, if the output signal from the second holding circuit has a higher signal level, the control circuit generates a lead control signal to move the phase of the spreading code forward. Conversely, if the output signal from the first holding circuit has a higher signal level, the control circuit generates a lag control signal to delay the phase of the spreading code signal.

The above-mentioned spread spectrum signal receiving apparatus further comprises a clock signal generator for generating a clock signal according to an output signal from the phase synchronizing circuit, wherein a spreading code generator generates a plurality of spreading codes in step with the clock signal, and wherein a control circuit shifts the phase of the clock signal, and thus, also shifts the phase of the spreading codes generated by the spreading code generator, according to an output signal from the correlation detector.

In another invention of the present invention the spread spectrum signal receiving apparatus comprises a first despreading circuit for despreading a received spread spectrum signal by using one spreading code; a synchronizing signal generator for generating a signal synchronized with the phase of a first despread signal according to the first despread signal obtained by the first despreading circuit; a spreading code generator for generating the above-mentioned one spreading code and another spreading code, out of phase with the one spreading code, according to an output signal of the synchronizing signal generator; a second despreading circuit for despreading the received spread spectrum signal by using the other spreading code, which is out of phase with the one spreading code; a correlation detector for detecting the correlation between the received spread spectrum signal and each of the plurality of spreading codes according to the first and second despread signals obtained from the first and second despreading circuits; and a control circuit for shifting the phase of the spreading codes generated by the spreading code generator according to an output signal from the correlation detector.

The spreading code generator generates a first spreading code and at least either of a second spreading code, leading the phase of the first spreading code or a third spreading code, lagging the phase of the first spreading code, according to an output signal from the synchronizing signal generator.

Further, if the correlation detector includes a first level detector for detecting the correlation for the first de-spread signal, and a second level detector for detecting the correlation for the second de-spread signal, the correlation detector can compare the output of the first level detector with the output of the second level detector without any switching actions. From the result of this comparison, the control circuit can detect the direction of change required for better correlation between the received spread spectrum signal and the spreading code, and obtain an appropriate phase for the spreading code.

In another invention of the present invention, the spread spectrum signal receiving apparatus comprises a despreading circuit for despreading a received spread spectrum signal; a synchronizing signal generator for generating a signal which is synchronized with the phase of a despread signal obtained at the despreading circuit; a spreading code generator for generating a spreading code for despreading the received spread spectrum signal, the spreading code generator generating a plurality of spreading codes, which are out of phase with one another, according to an output signal from the synchronizing signal generator; a correlation detector for detecting the correlation between the spread spectrum signal and each of the plurality of spreading codes from the plurality of despread signals which are obtained by supplying the plurality of spreading codes, output from the spreading code generator, to the despreading circuit; and a control circuit for shifting the phase of the spreading code generated by the spreading code generator according to an output signal from the correlation detector.

The spreading code generator generates a first; spreading code and at least either of a second spreading code, leading the phase of the first spreading code, or a third spreading code, lagging the phase of the first spreading code, according to an output signal from the synchronizing signal generator.

In the above arrangement, it is possible to detect the direction of change required for better correlation between the spread spectrum signal and each of the spreading codes from the despread signals which are obtained by using despreading codes that are out of phase with one another and supplied sequentially to one despreading circuit.

In another invention, the spread spectrum signal receiving apparatus comprises: a despreading circuit for de-spreading a received spread spectrum signal; a synchronizing signal generator for generating a signal which is synchronized with the phase of the despread signal according to a despread signal obtained at the despreading circuit; a spreading code generator for generating a spreading code for despreading the received spread spectrum signal, the spreading code generator generating a plurality of spreading codes according to an output signal from the synchronizing signal generator; a correlation detector for detecting the correlation between the received spread spectrum signal and each of the plurality of spreading codes; and a control circuit for shifting the phase of said spreading codes, generated by said spreading code generator, according to an output signal from the correlation detector.

The control circuit comprises a comparator and a control signal generator, and the comparator detects the direction of change required for better correlation between the received spread spectrum signal and one of the spreading codes according to an output signal from the correlation detector, and the control signal generator generates a lead or lag control signal to either advance or delay the phase of the spreading codes according to the output signal of the comparator.

The control circuit controls the phase of the spreading codes so that they are shifted sequentially until the output signal from the correlation detector reaches an appropriate value. Therefore, it is possible to obtain a spreading code which has a phase in which produces the optimum correlation and use it in the first despreading circuit for accurate despreading of the spread spectrum signal.

DESCRIPTION OF THE PREFERRED EMBODIMENTS

[First Embodiment]

Figure 1:
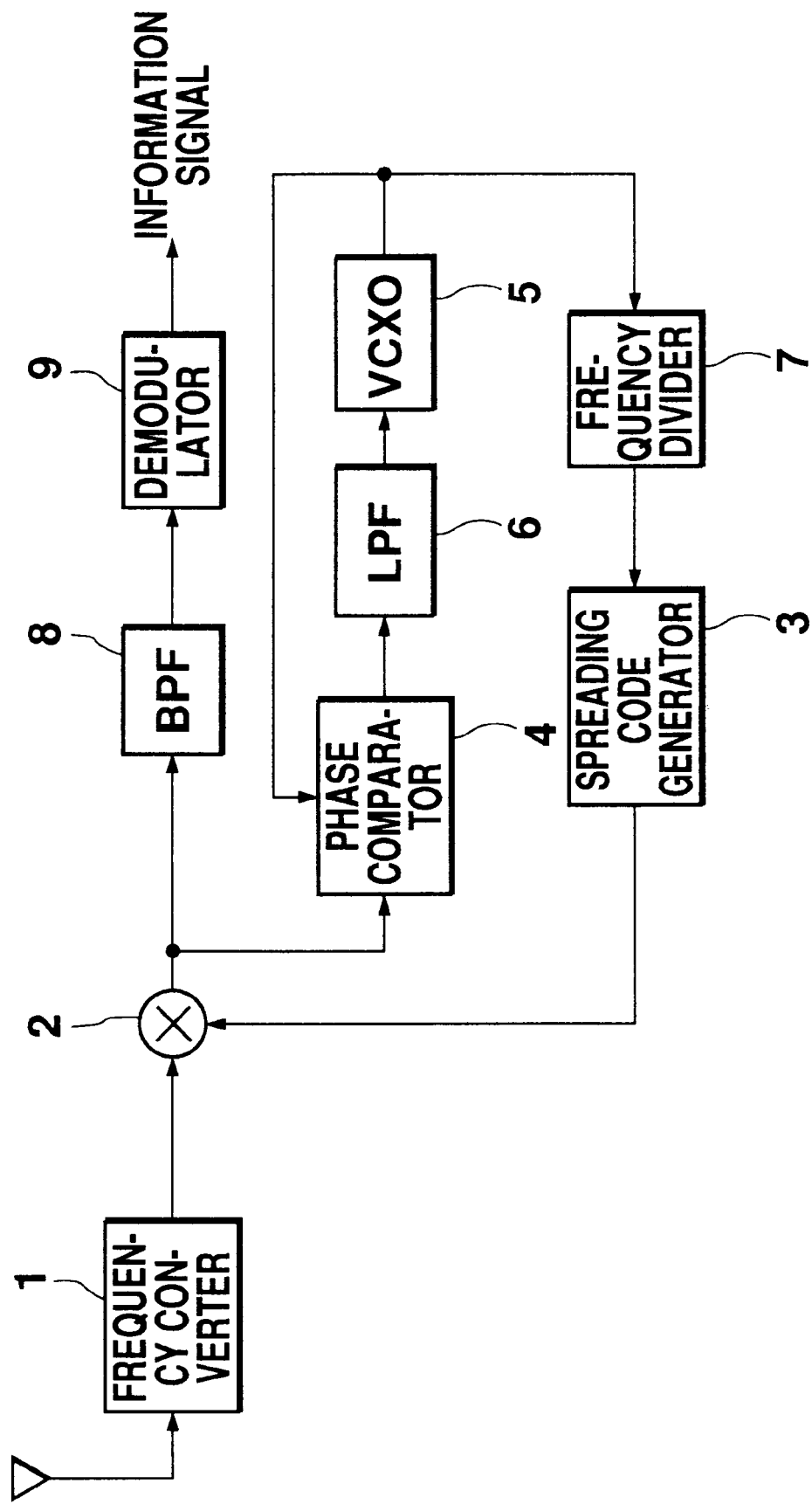
FIG. 1 shows the conventional spread spectrum signal receiving apparatus.
Figure 2:
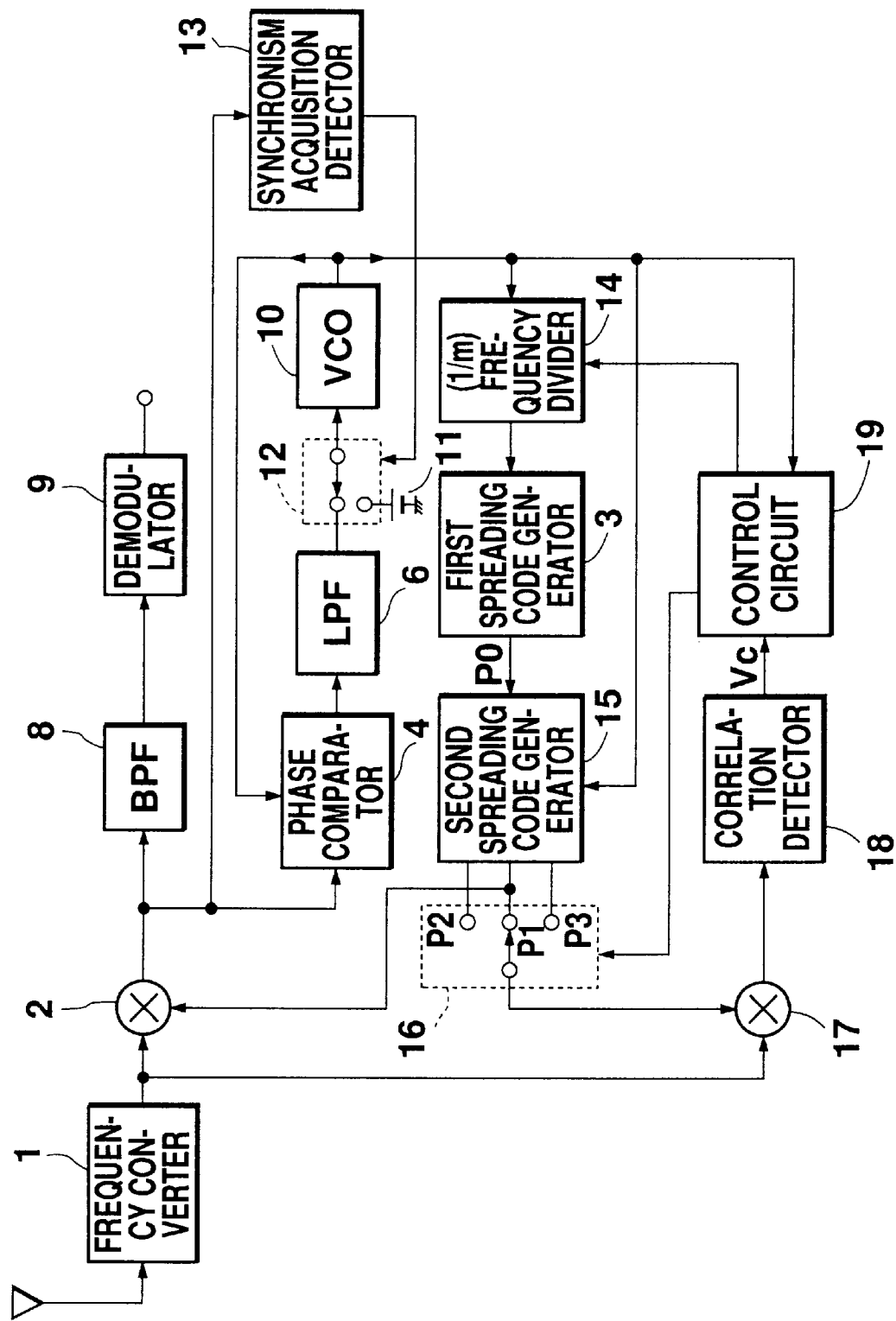
FIG. 2 shows the spread spectrum signal receiving apparatus according to a first embodiment of the present invention.

FIG. 2 shows a schematic construction of the spread spectrum signal receiving apparatus according to a first embodiment of the present invention. Those circuits which are identical with the circuits in the prior art example in FIG. 1 are designated by the same reference numerals and their descriptions are omitted. Reference numeral 10 denotes a VCO with a variable oscillation frequency, 11 denotes a d.c. voltage source for applying a d.c. voltage to the VCO 10, 12 denotes a first selector for selecting either the output signal of the LPF 6 or the d.c. voltage source 11, 13 denotes an acquisition detector for detecting synchronization acquisition according to the output of the first multiplier 2, 14 denotes a frequency divider, used as a clock signal generator, for generating spreading codes, 15 denotes a second spreading code generator for generating first to third spreading codes P1 to P3 according to a spreading code P0 from a first spreading code generator 3, 16 denotes a second selector for selecting one of the first to third spreading codes P1 to P3, 17 denotes a second multiplier as a second despreader to multiply a spread spectrum signal by the output of the second selector 16, 18 denotes a correlation detector for detecting the correlation between the spread spectrum signal and a spreading code, and 19 denotes a control circuit for controlling the second selector 16 and also for controlling the frequency divider 14 according to the output signal, Vc of the correlation detector 18. Note that although VCO 10 is used here because it has a wider frequency range than VCXO 5, a standard VCXO 5 can be used.

In FIG. 2, a received spread spectrum signal is changed by a frequency converter 1 to a lower frequency bandwidth, then the spread spectrum signal is multiplied in the first multiplier 2 (first despreading circuit) by a spreading code generated by the second spreading code generator 15. The output signal of the first multiplier 2 is compared with the output signal of the VCO 10 in the phase comparator 4. The output signal of the phase comparator 4, which depends on the result of phase comparison, is smoothed by the LPF 6, and after passing through the first selector circuit 12, the output signal is applied as a control signal to the VCO 10. Here, the circuits, including the phase comparator 4, the LPF 6, the VCO 10, constitute a phase-locking circuit, or the so-called PLL which operates so that the phase difference between the two input signals to the phase comparator 4 becomes zero.

The output signal of the VCO 10 is applied to both the phase comparator 4 and the frequency divider 14, and its frequency is divided to 1/m. A spreading code P0 is generated by the first spreading code generator 3, which is in step with the output signal of the frequency divider 14. According to the spreading code P0, the second spreading code generator 15 generates a first spreading code P1 as a reference, a second spreading code P2 leading the first spreading code P1 by a specified phase difference and a third spreading code P3 lagging the first spreading code P1 by a specified phase difference.

Figure 3:
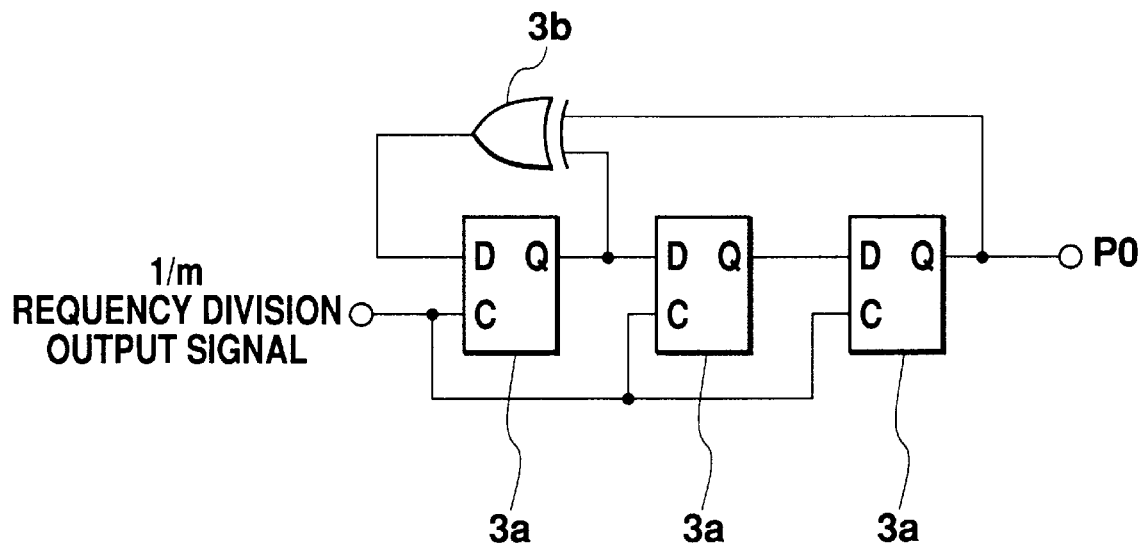
FIG. 3 shows the first spreading code generator 3 in FIG. 2.

The first spreading code generator 3 may comprise for example, shift registers 3a connected serially in three stages and an exclusive OR gate 3b as shown in FIG. 3. A 1/m frequency division signal, from the 1/m frequency divider 14, is supplied as a clock signal to the C terminal of each shift register 3a, and a spreading code P0 of m-sequence is output from the Q terminal of the shift register 3a at the final or third stage as shown in FIG. 3. Note that output from the Q terminal of the third-stage shift register is supplied to one input terminal of the exclusive OR gate 3b, and output from the Q terminal of the first-stage shift register 3a is supplied to the other input terminal of the exclusive OR gate 3b. In addition, the output of the exclusive OR gate is supplied to the D terminal of the first-stage shift register 3a.

Figure 4:
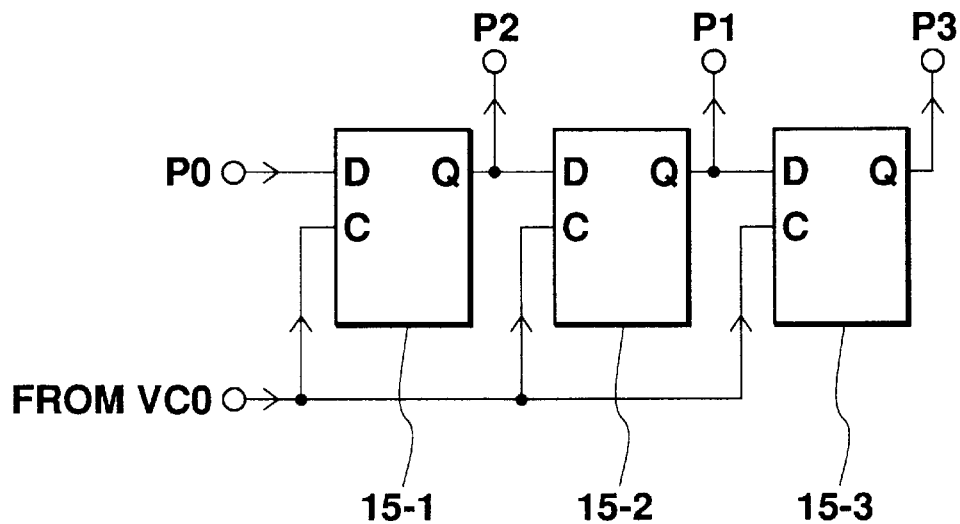
FIG. 4 shows the second spreading code generator 15 in FIG. 2.

The second spreading code generator 15 may comprise, for example, shift registers 15-1 to 15-3 connected serially in three stages as shown in FIG. 4. The shift registers 15-1 to 15-3 use the spreading code P0 from the first spreading code generator circuit as data and the signal from the VCO 10 as a clock signal. A spreading code P0 supplied to the D terminal of the first-stage shift register 15-1 is transferred sequentially to the second-stage and third-stage shift registers 15-2 and 15-3. If the output signal from the Q terminal of the second-stage shift register 15-2 is designated as the first spreading code P1, a second spreading code P2, leading the first spreading code P1 in terms of phase by one clock tick relative to the clock signal generated by the VCO 10, is output from the Q terminal of the first-stage shift register 15-1. A third spreading code P3, lagging the first spreading code P1 in terms of phase by one clock tick relative to the clock signal generated by the VCO 10, is output from the Q terminal of the third-stage shift register 15-3.

Spreading codes from the second spreading code generator circuit 15 are applied to the first multiplier 2. Since the timing of the spreading code from the first spreading code generator 3 changes in accordance with changes in the oscillation frequency of the VCO 10, the PLL operates so that the output signal of the first multiplier 2 and the output signal of the VCO 10 are synchronized. Therefore, using the PLL technique, the synchronization of the output signal of the first multiplier 2 with the output signal of the VCO 10 can be maintained.

However, before maintaining synchronization, synchronization must first be acquired, so a synchronization acquisition system will be described. When acquiring synchronization, the first selector 12 selects the d.c. voltage source 11, and accordingly, a specified oscillation frequency is generated by the VCO 10, and the PLL operates to acquire synchronization. The above-mentioned specified oscillation frequency is set so as to be a desired phase-locking frequency. The synchronization acquisition detector 13 detects synchronism acquisition when the output signal of the first multiplier 2 rises above a specified level, and then, sends a signal to the first selector 12 which then selects the output signal of the LPF 6 instead of the d.c. voltage source 11. Consequently, the oscillation frequency of the VCO 10 is varied so that the phase difference of the two input signals to the phase comparator 4 is reduced to zero, and the output oscillation frequency of the VCO 10 becomes the phase-locking frequency for the PLL.

At the same time, the output signal of the VCO 10 is applied to the control circuit 19, and based on this input, the control circuit 19 applies a first control signal to the second selector 16 which thereby selects among spreading codes P1 to P3. The received spread spectrum signal and the spreading code supplied through the second selector 16 are multiplied together in the second multiplier 17, and thus the spread spectrum signal is despread. The despread signal is supplied to the correlation detector 18, which detects the correlation between the spread spectrum signal and the spreading code. The control circuit 19 determines, from the correlation data Vc, whether the phase of the spreading code is leading or lagging the phase of the spread spectrum signal, and according to the result, the control circuit 19 generates a second control signal. According to the second control signal, the timing of the output from the frequency divider 14 is varied. Specifically, if the control circuit determines that the phase of the spreading code is lagging the phase of the spread spectrum signal, the timing of the output of the frequency divider 14 is moved forward by the second control signal, and as a result, the phase of the spreading code is moved forward. Conversely, if the phase of the spreading code is leading the phase of the spread spectrum signal, the timing of the output of the frequency divider 14 is delayed, so that the phase of the spreading code is delayed.

By the operations above, a spreading code is generated which is synchronized with the spreading code in the spread spectrum signal, and the spread spectrum signal and the spreading code are multiplied together in the first multiplier 2, and therefore the spread spectrum signal is despread to the original bandwidth precisely. The output signal of the first multiplier 2 is then applied through the BPF 8 to the demodulator 9, which demodulates the signal to obtain the original information signal.

Figure 5:
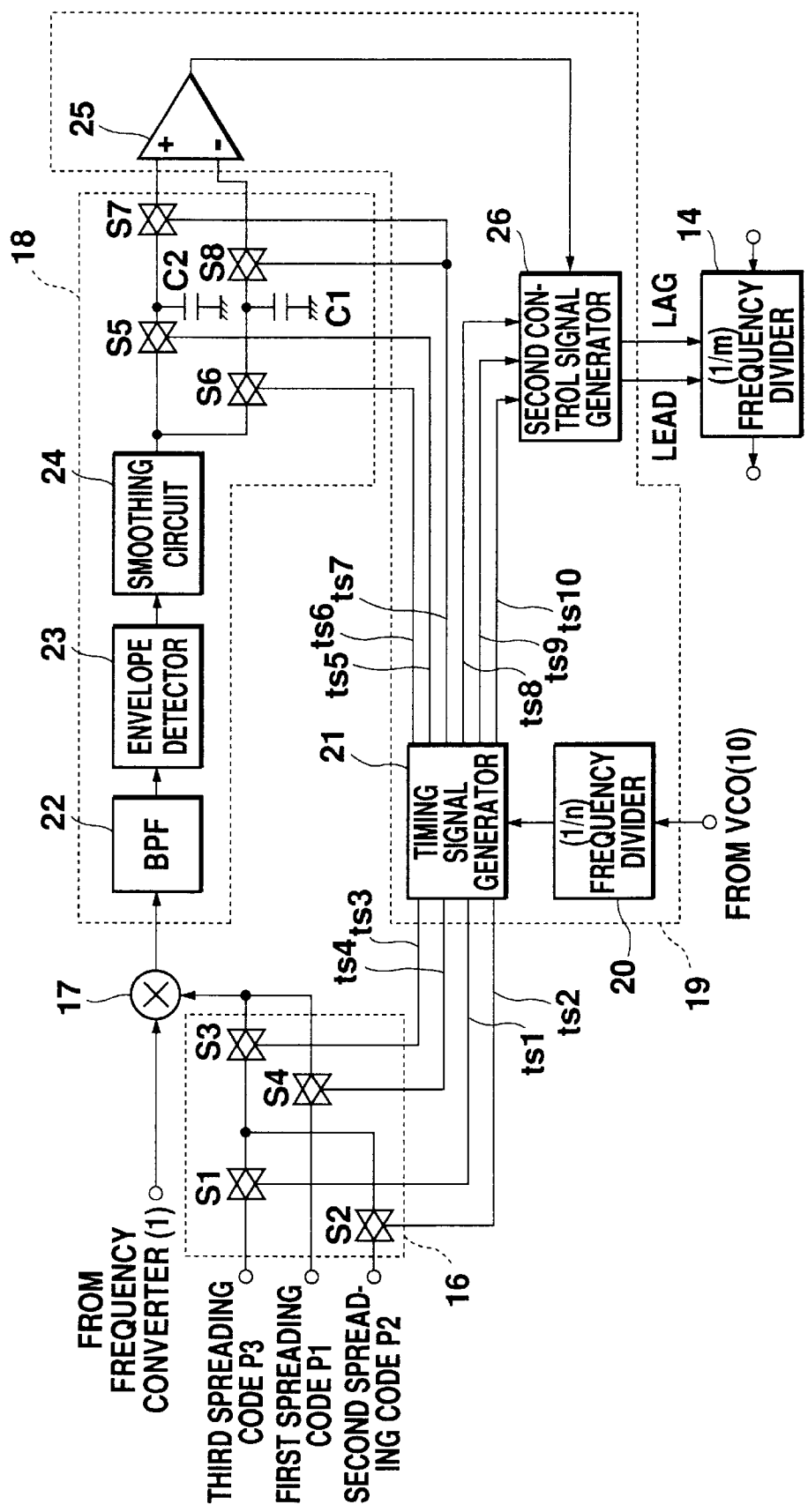
FIG. 5 shows the arrangement of a principal portion of the apparatus in FIG. 2.

FIG. 5 shows an example arrangement of the second selector 16, the correlation detector 18, and the control Circuit 19 from FIG. 2. In FIG. 5, transmission gates S1 to S4 constituting the second selector 16 are used to select one of the spreading codes P1 to P3 to be sent to the second multiplier 17. The frequency divider 20 divides the output signal of the VCO 10 in FIG. 2 by n, and the timing signal generator 21 generates timing signals ts1 to ts10 according to the output of the frequency divider 20. The BPF (band pass filter) 22 limits the output signal from the second multiplier 17 to a specified bandwidth, and an envelope detector 23, acting as a signal level detector, detects the envelope of the output signal of the BPF 22. A smoothing circuit 24 smoothes the output signal of the envelope detector 23, and the smoothed signal is supplied selectively to capacitors C1 and C2, as holding circuits, through transmission gates S5 and S6. The transmission gates S7 and S8 are used to selectively connect the capacitors C1 or C2 to the positive and negative input terminals of the comparator 25. The comparator 25 compares the signal levels of the capacitors C1 and C2, and according to the result of the comparison, the second control signal generator 26 determines whether or not to generate a second control signal. The divisor n for the frequency divider 20 is set to be large enough compared with the divisor m of the frequency divider 14 so that the spreading code selection period in the second selector 16 is longer than at least one spreading code period (one period is the time corresponding to one pattern of a spreading code).

Initially, a first spreading code P1 is applied to the first multiplier 2 in FIG. 2 where the spreading code P1 is multiplied by the spread spectrum signal. Subsequently, the output signal of the first multiplier 2 is applied to the demodulator 9 and the phase comparator 4 and the circuit operation begins.

The frequency divider 20 divides the output signal of the VCO 10 by n, and generates a clock signal. The clock signal is applied to the timing signal generator 21, and the timing signal generator 21 generates timing signals ts1 to ts10 in step with the clock signal. The transmission gates S1 to S8 are controlled by the timing signals ts1 to ts7 and turn on when the applied signals are at the "H" level.

On the other hand, an output signal is produced by the second multiplier 17 by multiplying a spreading code, selected according to timing signals, ts1 to ts4, by the spread spectrum signal, and after having its frequency limited to a specified bandwidth by the BPF 22, the output signal has its envelope detected by the envelope detector 23. The envelope detection output signal is a signal showing the correlation between the spread spectrum signal and the spreading code, and is a triangular wave signal which is at a high output level when synchronism is obtained and which is at zero when the phase shift is greater than one code chip. Subsequently, the envelope detection output signal is smoothed by the smoothing circuit 24, and the output signal of the smoothing circuit 24 is held by capacitor C1 or C2. After this, correlation output Vc from the capacitors C1 and C2 is supplied to the comparator 25 which compares output levels.

With reference to the timing chart in FIG. 6, the operation of the arrangement in FIG. 5 will be described. In the period T1 in FIG. 6, the timing signals ts2, ts3 and ts5 go to "H", so that the transmission gates S2, S3 and S5 turn on. Therefore, spreading code P2 is selected and applied to the second multiplier 17. The data showing correlation according to the despread signal obtained by despreading the spread spectrum signal by the second spreading code P2 is sent through the BPF 22, the envelope detector 23, and the smoothing circuit 24, and is used to obtain the correlation Vc2 which is sent through the transmission gate S5 to the capacitor C2 where the data for correlation Vc2 is held.

Figure 6:
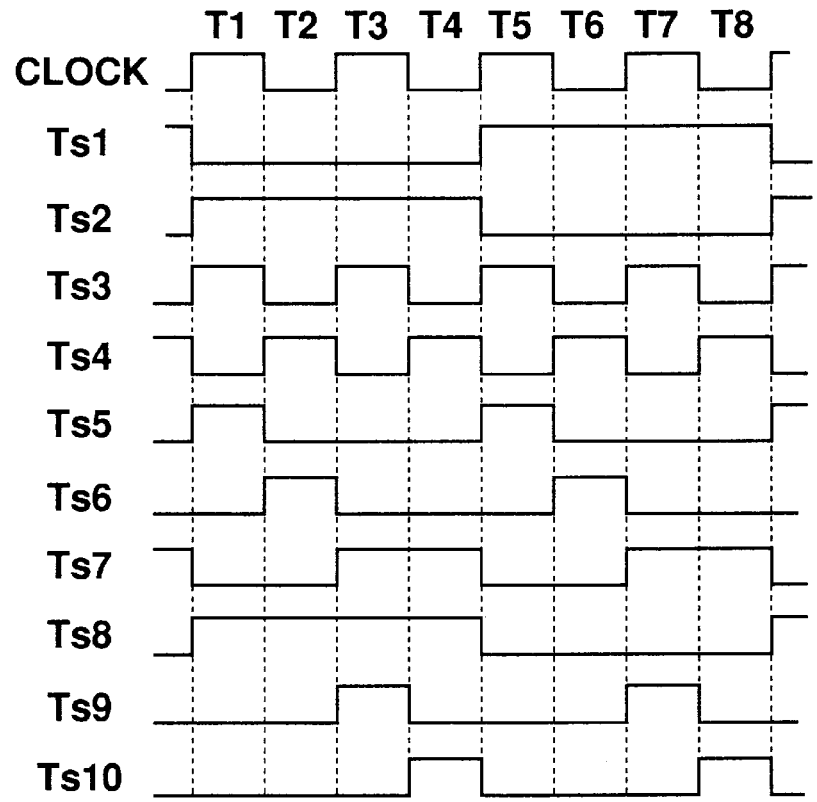
FIG. 6 shows the operation of the apparatus in FIG. 2.

In the period T2 in FIG. 6, the timing signals ts2, ts4 and ts6 go to "H", such that the transmission gates S2, S4 and S6 turn on. Note that timing signal ts3 is "L", so that transmission gate S3 is off, spreading code P1 is selected, and the data showing correlation Vc1 according to a despread signal obtained by despreading the spread spectrum signal by the first spreading code P1 is sent through transmission gate S6, and is held as a data (showing correlation) Vc1 in the capacitor C1.

In the period T3 in FIG. 6, the timing signals ts5 and ts6 are "L", so that transmission gates S5 and S6 are off, and no new signal is sent to capacitors C1 and C2. However, since the timing signal ts7 is "H", the transmission gates S7 and S8 turn on, and the signals held in the capacitors C1 and C2 are supplied to the input terminals of the comparator 25, which compares their levels. When the signal level held in the capacitor C2 is larger than the signal level held in the capacitor C1, the comparator 25 generates an "H" level signal, and, if the timing signal ts9 is "H", the output signal of the comparator 25 is received by the second control signal generator 26.

During the period T4 in FIG. 6, the timing signal ts10 goes to "H", and because the timing signal ts8 is "H" and the output signal of the comparator 25 is "H", the second control signal generator 26 generates a "lead" second control signal to advance the timing of the frequency divider 14. During the periods T1 to T4, the timing signal ts8 is "H", such that when the comparator 25 generates an "H" level output signal, the second control signal generator 26 generates a "lead" second control signal.

Furthermore, during the period T5 in FIG. 6, the timing signals ts1, ts3 and ts5 go to "H", so that transmission gates S1, S3 and S5 turn on and the third spreading code P3 is selected, data showing correlation Vc3 according to a despread signal obtained by despreading the spread spectrum signal by the third spreading code P3 passes through transmission gate S5, and is held in the capacitor C2.

In the period T6 in FIG. 6, the timing signals ts1, ts4 and ts6 are "H", such that the transmission gates S1, S4 and S6 are on. Note that timing signal ts3 is "L", so that transmission gate S3 is off, spreading code P1 is selected, and the correlation Vc1 is sent through transmission gate S6 and held in the capacitor C1.

In the period T7 in FIG. 6, the timing signals ts5 and ts6 are "L", so that transmission gates S5 and S6 are off and no new signal is sent to capacitors C1 and C2. However, the timing signal ts7 is "H", the transmission gates S7 and S8 turn on, and the comparator 25 compares the signal levels held in the capacitors C1 and C2. The comparator 25 generates an "H" level signal only when the signal level of capacitor C2 is higher than the signal level of capacitor C1. Because the timing signal ts9 is "H", the output signal of the comparator 25 is received by the second control signal generator 26.

In period T8, in FIG. 6, the timing signal ts10 goes to "H", and because the timing signal ts8 is "L" and the comparator 25 signal is "H", the second control signal generator 26 generates a "lag" second control signal to delay the timing of the frequency divider 14. During periods T5 to T8, the timing signal ts8 is "L", such that when the comparator 25 generates an "H" level output signal, the second control signal generator 26 generates a "lag" second control signal.

Figure 7:
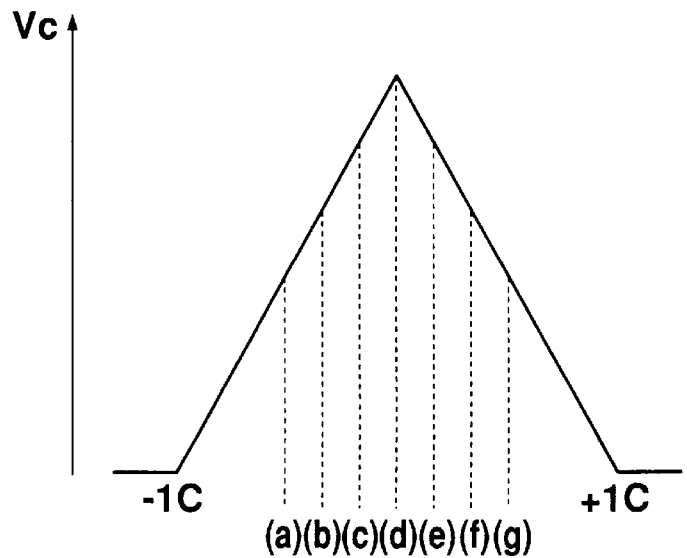
FIG. 7 explains the correlation between a spread spectrum signal and a spreading code.

FIG. 7 shows the correlation between the first to third spreading codes and the spread spectrum signal. If the correlation data Vc1, Vc2 and Vc3 are respectively (b), (c) and (a), the respective levels of correlation are Vc2>Vc1>Vc3, and therefore the output signal of the comparator 25 is "H" for the period T3 in FIG. 6, and therefore a "lead" second control signal is generated, which advances the timing of the frequency divider 14. The levels of correlation between the first to third spreading codes and the spread spectrum signal then change to (c), (d) and (b) in FIG. 7, respectively. If the data showing the correlations Vc1, Vc2 and Vc3 between the first to third spreading codes and the spread spectrum signal are (f), (g) and (e), their levels of correlation are Vc3>Vc1>Vc2, and therefore the output signal of the comparator 25 is at "H" level for the period T7 in FIG. 6, so that a "lag" second control signal is generated, which delays the timing of the frequency divider 14. The levels of data showing correlation Vc1, Vc2 and Vc3 between the first to third spreading codes and the spread spectrum signal then change to (e), (f) and (d) in FIG. 7, respectively.

As the operations in T1 to T8 in FIG. 5 repeat, the correlation Vc1 between the first spreading code P1 and the spread spectrum signal moves to (d) in FIG. 7. At this stage, an adequately synchronized phase between the first spreading code and the spread spectrum signal has been obtained. This spreading code P1 is supplied to the first multiplier 2 through the first spreading code generator 3 and the second spreading code generator 15. The first multiplier 2 then despreads the spread spectrum signal by multiplying the first spreading code P1 and the spread spectrum signal together, and the spread spectrum signal is despread accurately.

In FIG. 5, the output level of the envelope detector 23 varies minutely, and as such, the envelope detection signal is smoothed by the smoothing circuit 24 to enable an accurate comparison to be performed by the comparator 25. In place of the smoothing circuit 24 in FIG. 5, a minimum value detection circuit may be used to detect the minimum value of the output signal of the envelope detector 23 so that the minimum value is then held in the capacitor.

Figure 8:
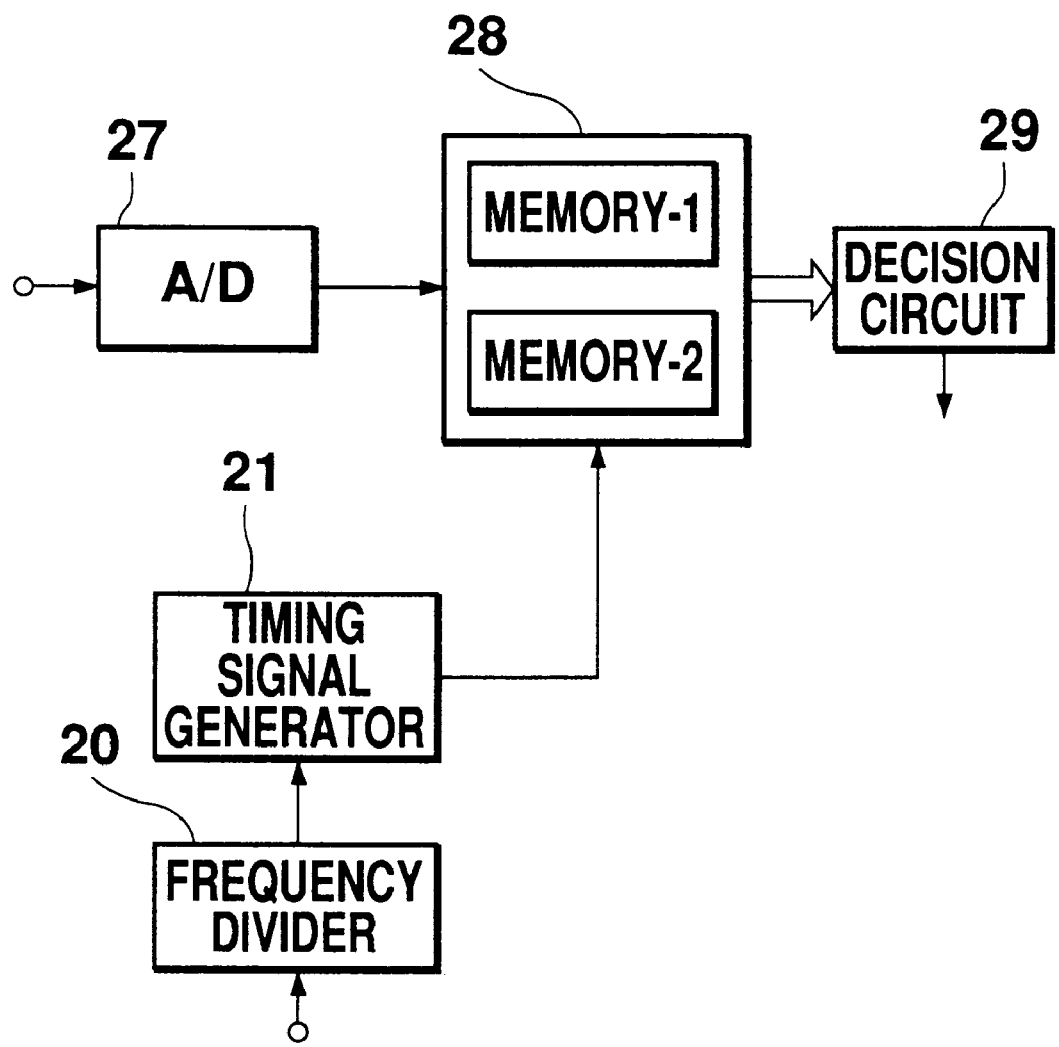
FIG. 8 shows another example of the arrangement of the portion in FIG. 5.

FIG. 8 shows an example arrangement which uses memories, in place of the capacitors, as the holding circuits in the circuit arrangement in FIG. 5. In FIG. 8, the A-D converter 27 converts the analog output signal of the smoothing circuit 23 into a digital signal. The memory 28 includes a memory-1 area and a memory-2 area, and in response to a timing signal from the timing signal generator 21, memory-1 stores digital correlation data for the first spreading code P1, while memory-2 stores digital correlation data for, alternately, second and third spreading codes P2 and P3. A decision circuit 29 compares the output data from the memory 28, and if the data in memory-2 is greater than the data in memory-1, generates an "H" level output signal. Although examples have been shown in which capacitors or an A-D converter and memories are used as the holding circuits, the present invention is not limited to those examples only, other means may be used for the holding circuits.

The operation of the frequency divider 14 will be described with reference to the timing chart in FIG. 9. The frequency divider 14 can be formed by, for example, m stages of rising edge detection type flip-flops. The first-stage flip-flop is cleared or preset according to a second control signal from the control circuit 26. When the clock signal, as shown in (a) of FIG. 9, of the VCO 10 is applied to the frequency divider 14, the signal obtained by dividing the clock frequency in half has the waveform indicated by the solid lines (b) and (f) in FIG. 9, and the signal obtained by dividing the clock frequency by four has the waveform indicated by the solid lines (c) and (g) in FIG. 9. Furthermore, a signal that is 1/m of the clock frequency, i.e., the final output of the frequency divider 14, has the waveform indicated by the solid lines (d) and (h) in FIG. 9.

Figure 9:
FIG. 9 shows the operation of the frequency divider 14 in FIG. 5.
Figure 9:
Figure 9:
Figure 9:
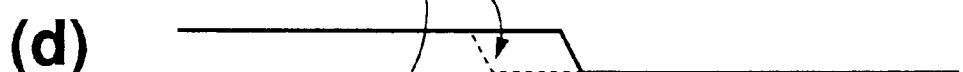
Figure 9:
Figure 9:
Figure 9:
Figure 9:
Figure 9:

If a lead second control signal, as in (e) of FIG. 9, is applied to the frequency divider 14, the first-stage flip-flop is cleared, and the ½ clock frequency signal, (b) in FIG. 9, goes from "H" to "L", as indicated by the dotted line in (b) in FIG. 9, similarly the ¼ clock frequency signal changes as indicated by the dotted line in (c) in FIG. 9, in other words, the dotted lines in (b), (c), and (d) indicate an earlier timing than the solid lines.

If a lag second control signal, as in (i) in FIG. 9, is applied to the frequency divider 14, the first-stages flip-flop is preset and, as such, does not respond to the rise of the clock, as shown by the dotted line in (f) in FIG. 9, and the ½ clock frequency signal remains "H". The ½ clock frequency signal then oscillates as shown by the dotted line in (f) in FIG. 9, and ¼ clock frequency signal oscillates as shown by the dotted line in (g) in FIG. 9. Consequently, the output signal of the frequency divider 14 oscillates as shown by the dotted line in (h) in FIG. 9, such that the timing of the output of the frequency divider 14 is delayed from that of the solid line in (h) in FIG. 9.

The method of changing the phases of the first, second and third spreading codes P1, P2 and P3 is not limited to the above-mentioned method. For example, shift registers 3a or the like may be used to form the first spreading code generator 3 shown in FIG. 3 and may be set or preset to change the phases of the spreading codes P1 to P3.

[Second Embodiment]

Figure 10:
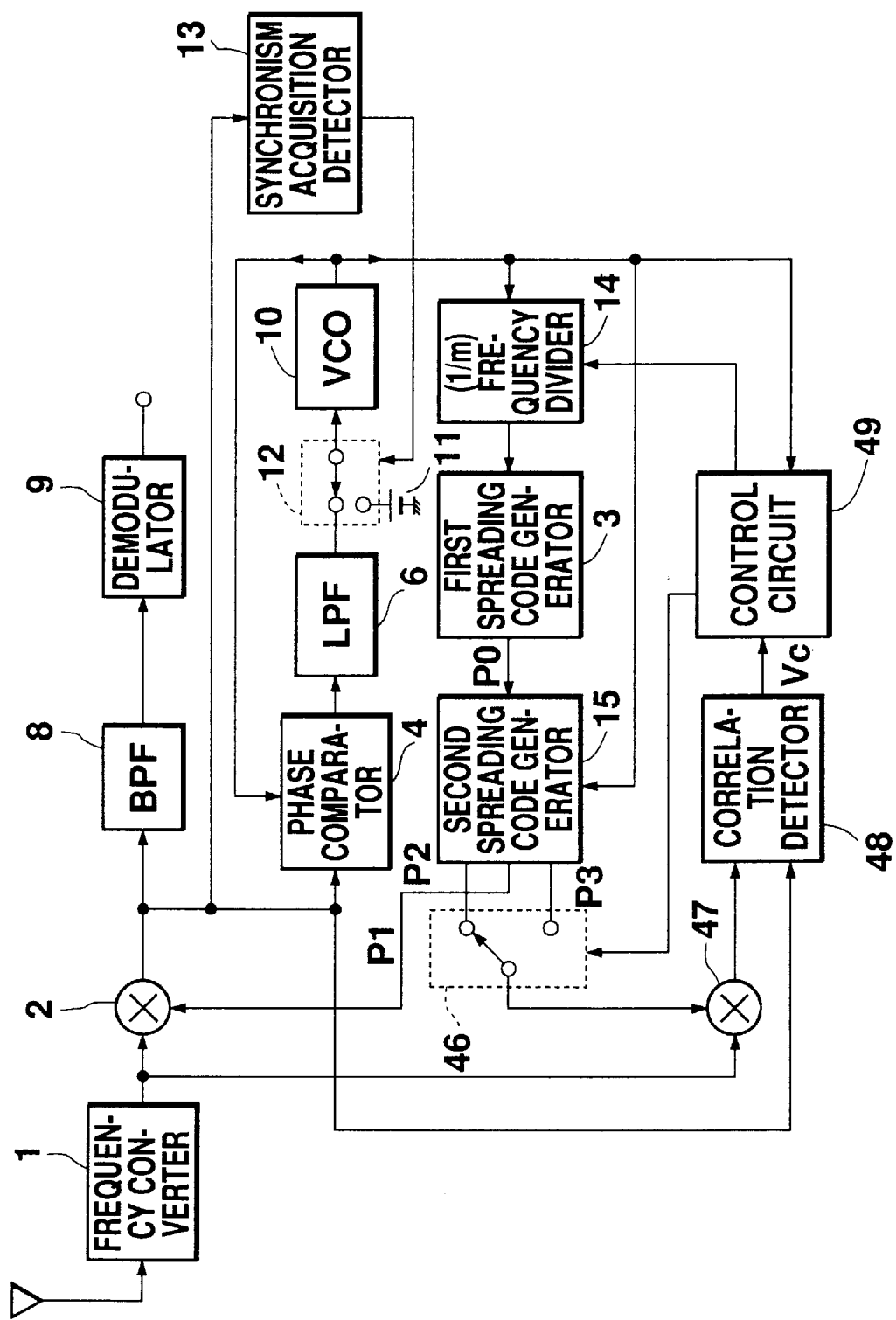
FIG. 10 shows the spread spectrum signal receiving apparatus according to a second embodiment of the present invention.

FIG. 10 shows a second embodiment of the present invention. Those parts that are identical with parts shown in the previous figures are designated by the same reference numerals and their descriptions are omitted.

In FIG. 10, reference numeral 46 denotes a second selector for selecting either one of the second and third spreading codes, 47 denotes a second multiplier as a second despreader for multiplying the spread spectrum signal by either one of the second and third spreading codes P2 and P3 from the second selector, 48 denotes a correlation detector for detecting the correlation between the spread spectrum signal and a spreading code, 49 denotes a control circuit for controlling the second selector 46 and also for controlling the frequency divider 14 according to the output signal Vc of the correlation detector 48.

In this circuit arrangement, like in the first embodiment, first, the first selector 12 selects the d.c. voltage source for the PLL to acquire synchronism.

However, in this case, when the appropriate output signal from the VCO 10 is applied to the control circuit 49, the control circuit 49 applies a first control signal to the second selector 46 which thereby selects between spreading codes P2 and P3. The correlation between the received spread spectrum signal and the spreading code is detected by the correlation detector 48. The control circuit 49 then uses the correlation data to detect whether the phase of the spreading code is leading or lagging the phase of the spread spectrum signal, and according to the result, the control circuit 49 generates a second control signal. According to the second control signal, the timing of the output of the frequency divider 14 is varied. Specifically, if the control circuit determines that the phase of the spreading code is lagging the phase of the spread spectrum signal, the timing of the output of the frequency divider 14 is moved forward by the second control signal, and as a result, the phase of the spreading code is moved forward. Conversely, if the phase of the spreading code is leading the phase of the spread spectrum signal, the timing of the output of the frequency divider 14 is delayed, so that the phase of the spreading code is delayed.

By the operations above, a spreading code is generated which is synchronized with the spreading code in the spread spectrum signal, and the spread spectrum signal and the spreading code are multiplied together in the first multiplier 2, and therefore the spread spectrum signal is despread to the original bandwidth precisely. The output signal of the first multiplier 2 is then applied through the BPF 8 to the demodulator 9, which demodulates the signal to obtain the original information signal.

Figure 11:
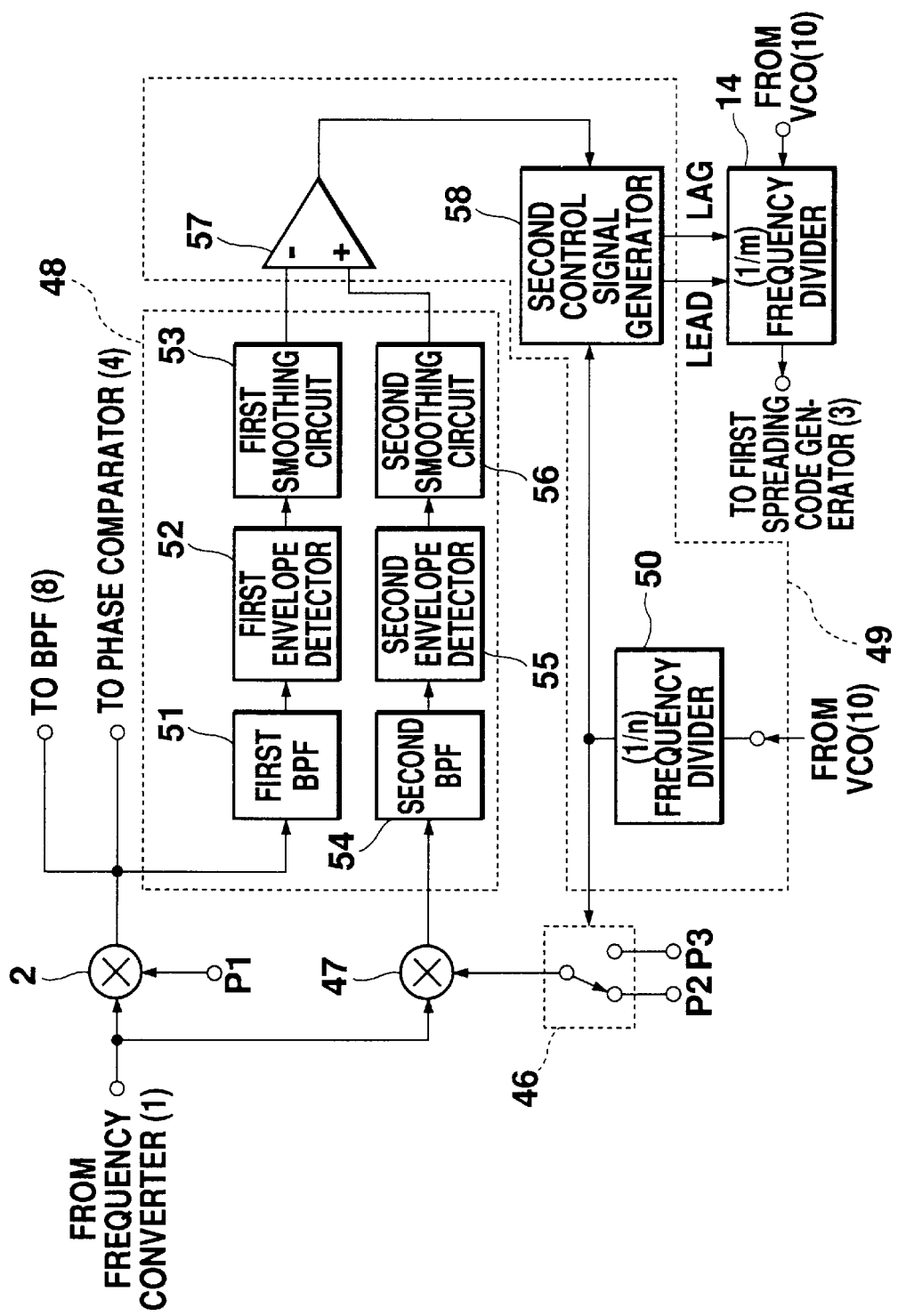
FIG. 11 shows the arrangement of the principal portion of the apparatus in FIG. 10.

FIG. 11 shows an arrangement of the principal portion of the apparatus in FIG. 10. In FIG. 11, reference numeral 50 denotes a frequency divider for dividing the output signal of the VCO 10 by n, 51 denotes a first BPF for limiting the output signal of the first multiplier 2 to a specified bandwidth, 52 denotes a first envelope detector, which acts as a signal level detector, to detect the envelope of the output signal of the first BPF 51, 53 denotes a first smoothing circuit for smoothing the output signal of the first envelope detector 52, 54 denotes a second BPF for limiting the output signal of the second multiplier 2 to a specified bandwidth, 55 denotes a second envelope detector, which acts as a signal level detector, to detect the envelope of the output signal of the second BPF 54, 56 denotes a second smoothing circuit for smoothing the output signal of the second envelope detector 55, 57 denotes a comparator for comparing the output signals of the first and second smoothing circuits 53 and 56, and 58 denotes a second control signal generator for generating a second control signal according to a signal from the comparator 57. Note that the divisor n for the frequency divider 50 is set to be large enough compared with the divisor m for the frequency divider 14 so that the spreading code selection period in the second selector 46 is longer than at least one spreading code period (one period is the time corresponding to one pattern of a spreading code).

Initially, the spread spectrum signal is multiplied by a first spreading code P1 in the first multiplier 2 in FIG. 10. The output signal of the first multiplier 2 is then applied to the BPF 8, the phase comparator 4 and also to the first BPF 51. After having its frequency limited to a specified bandwidth by the first BPF 51, the output signal's envelope is detected by the first envelope detector 52. The envelope detection output signal is a signal showing the correlation between the spread spectrum signal and the spreading code, and as has been described with reference to FIG. 7, the envelope detection output signal is a triangular wave signal which is at a high output level when synchronism is obtained and which is at zero when the phase shift is greater than one code chip (one code chip is a time corresponding to one bit of a spreading code). The output signal of the first envelope detector 52 (the first envelope detection output signal) is smoothed by the first smoothing circuit 53, and then applied to the negative input terminal of the comparator 57. At the same time, the received spread spectrum signal and a spreading code, selected by the second selector 46 out of the second and third spreading codes P2 and P3, generated by the second spreading code generator 15 are input to the multiplier 47. The second multiplier 47 multiplies the spread spectrum signal and the spreading code (P2 or P3) together, and the spread spectrum signal is despread. The output signal of the second multiplier 47 has its frequency limited to a specified bandwidth by this second BPF 47 and the envelope is detected by the second envelope detector 55. The output signal of the second envelope detector 55 (the second envelope detection output signal) is smoothed by the second smoothing circuit, and then applied to the positive input terminal of the comparator 57. The output signal of the comparator 57 is applied to the second control signal generator 58, and according to the comparison result of the comparator 57 and the output signal of the frequency divider 50, the second control signal generator 58 generates a lead or lag second control signal.

Meanwhile, the frequency divider 50 divides an output signal of the VCO 10 by n to generate a timing signal. The timing signal is applied to the second selector 46 and the second control signal generator 58. When the timing signal goes to "H", the second selector 46 switches to select the second spreading code P2. Therefore, the comparator 57 compares the correlation data, Vc1 between the first spreading code P1 and the spread spectrum signal, and the correlation data, Vc2 between the second spreading code P2 and the spread spectrum signal. If the output signal level of the second smoothing circuit 56 is higher than that of the first smoothing circuit 53, the comparator 57 generates an "H" level output signal, and according to this signal, the second control signal generator 58 generates a lead second control signal. Based on an "H" level timing signal and an "H" level output signal from the comparator 57, the second control signal generator 58 generates a lead second control signal.

At the next period, if the timing signal goes to "L", the second selector 46, responding to a command from the control circuit 49, switches to select the third spreading code P3. Accordingly, the comparator 57 compares the correlation data, Vc1 between the first spreading code P1 and the spread spectrum signal, and the correlation data, Vc3 between the third spreading code P3 and the spread spectrum signal. If the output signal level of the second smoothing circuit 56 is higher than that of the first smoothing circuit 53, the comparator 57 generates an "H" level output signal. Based on an "L" level timing signal and an "H" level output signal from the comparator 57, the second control signal generator 58 generates a lag second control signal.

If the phase of the first spreading code P1 is lagging the phase of the spread spectrum signal, the correlation data, Vc1, Vc2 and Vc3, between the first, second and third spreading codes P1, P2 and P3 and the spread spectrum signal, are (b), (c) and (a) in FIG. 7, respectively, and the correlation levels are such that Vc2>Vc1>Vc3. If, during the "H" period of the timing signal, the comparator 57 generates an "H" level output signal, the second control signal generator 58 generates a "lead" second control signal, so that the timing of the output of the frequency divider 14 is moved forward. Consequently, the correlation data, Vc1, Vc2 and Vc3 between the first, second and third spreading codes P1, P2 and P3 and the spread spectrum signal, change to (c), (d) and (b) in FIG. 7, and the relation remains Vc2>Vc1>Vc3 and the process is repeated.

Conversely, if the phase of the first spreading code P1 is leading upon the phase of the spread spectrum signal, the correlation data, Vc1, Vc2 and Vc3 between the first, second and third spreading codes P1, P2 and P3 and the spread spectrum signal correspond to (f), (g) and (e) in FIG. 7, respectively, and the correlation levels such that are Vc3>Vc1>Vc2. If, during a period when the timing signal is at "L" level, the comparator 57 generates an "H" level output signal, the second control signal generator 58 generates a "lag" second control signal, so that the timing of the output of the frequency divider 14 is delayed. Consequently, the correlation data, Vc1, Vc2 and Vc3 between the first, second and third spreading codes P1, P2 and P3 and the spread spectrum signal, change to (e), (f) and (d) in FIG. 7, and the process is repeated.

As the above-mentioned operations repeat, the correlation data, Vc1 between the first spreading code P1 and the spread spectrum signal, moves to (d) in FIG. 7, and the spreading code and the spread spectrum signal are synchronized.

In FIG. 11, the output levels of both the first and second envelope detectors 52 and 55 vary minutely, and as such, the envelope detection signal must be smoothed. However, in place of the first and second smoothing circuits 53 and 56 in FIG. 11, minimum value detection circuits may be used to detect the minimum values of the output signals from the envelope detectors 52 and 55 so that these minimum values of correlation data, Vc, between the spreading codes and the spread spectrum signal, may be used for comparison.

In this second embodiment, the phase of the output signal from the frequency divider 14 is controlled by a lead or lag second control signal from the control circuit 49.

[Third Embodiment]

A third embodiment of the present invention will now be described with reference to FIG. 12. The feature of the third embodiment is the selection of one of the first, second and third spreading codes, P1, P2 and P3, each of which are out of phase with one another, and supply the selected spreading code to the first multiplier 2. Those parts which are identical with the first and second embodiments are designated by the same reference numerals, and their descriptions are omitted.

Figure 12:
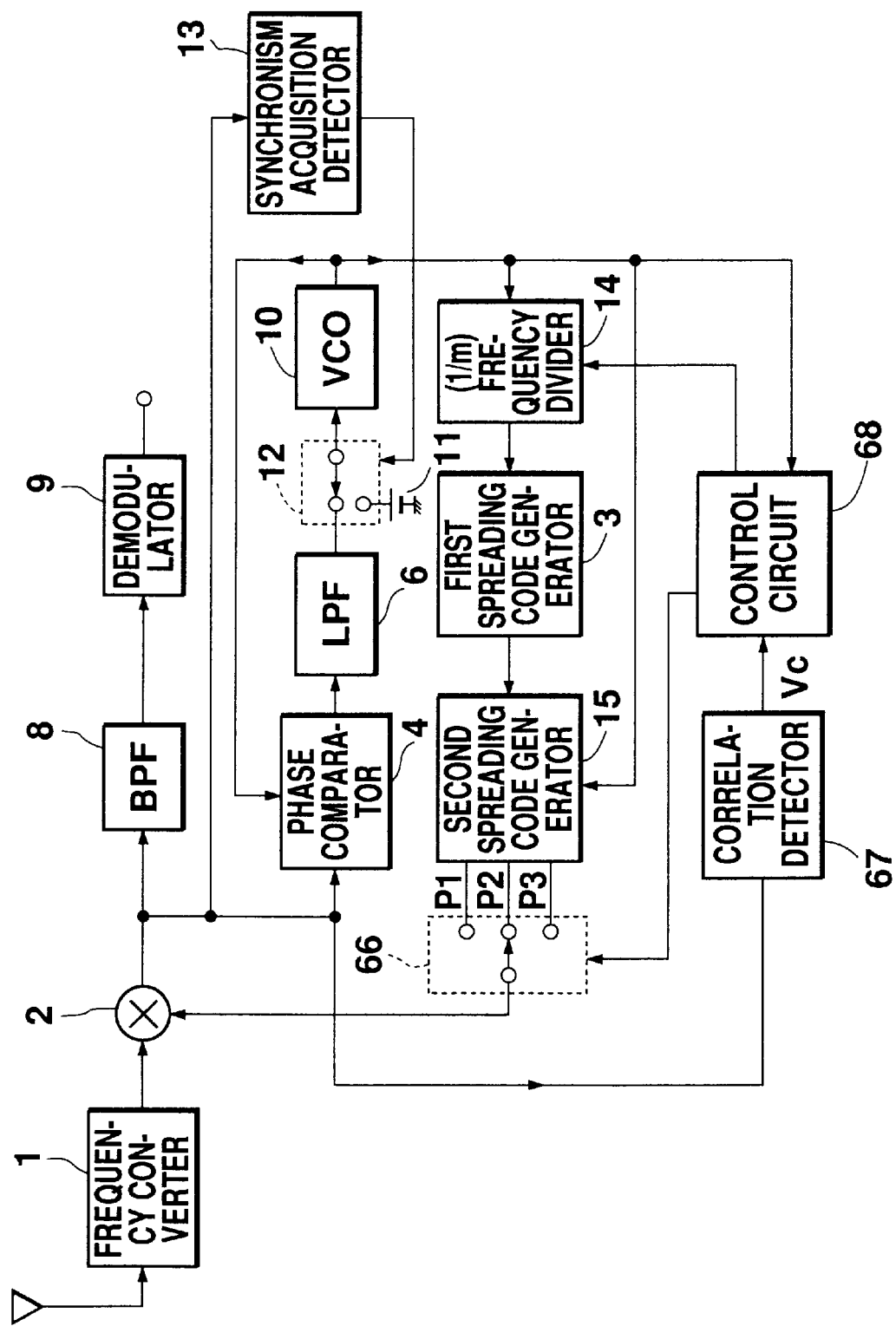
FIG. 12 shows the spread spectrum signal receiving apparatus according to a third embodiment of the present invention.

In FIG. 12, like in the first embodiment, the received spread spectrum signal has its frequency converted to a specified low frequency bandwidth. Then, the multiplier 2 (first despreading circuit) multiplies the spread spectrum signal from the frequency converter 1 by one of the spreading codes P1, P2 and P3, which has been selected by the second selector 66. The phase of the output signal of the first multiplier 2 is compared with the phase of the VCO 10 in the phase comparator 4. The output signal of the phase comparator 4 is smoothed by an LPF 6, and then is sent as a control signal to the VCO 10 through the first selector 12.

The maintenance of synchronism by using a PLL is the same as in the first embodiment, and its description is omitted.

The following procedure is used to achieve synchronization. First an output signal from the VCO 10 is supplied to the control circuit 68, and the control circuit 68 generates a first control signal accordingly. This first control signal is supplied to the second selector 66, which selects one of the three spreading codes, P1 to P3, each of which are out of phase with one another and are supplied from the second spreading code generator 15. The selected spreading code is multiplied by the received spread spectrum signal in the multiplier 2, by which the spread spectrum signal is despread to the original bandwidth. The output signal of the multiplier 2 is supplied to the phase comparator 4, the synchronization acquisition detector 13, and also to the correlation detector 67.

The correlation detector 67 detects the correlation between the spread spectrum signal and the selected spreading code P1, P2 or P3. The control circuit 68 then determines from the correlation data, Vc1 to Vc3, whether the phase of each of the spreading codes P1 to P3 is leading or lagging the phase of the spread spectrum signal. According to the result, the control circuit 68 generates a second control signal. According to this second control signal from the control circuit 68, the timing of the output of the frequency divider 14 is varied. To be more specific, if as the result of the comparison it is determined that the phase of the spreading code is lagging the phase of the spread spectrum signal, the timing of the output of the frequency divider 14 is moved forward, and therefore the phase of the spreading code is moved forward. Conversely, if it is determined that the phase of the spreading code is leading the phase of the spread spectrum signal, the timing of the output of the frequency divider 14 is delayed, and accordingly the phase of the spreading code is delayed.

Therefore, a spreading code is generated which is syhcnronized with the spreading code in the spread spectrum signal, and the generated spreading code and the spread spectrum signal are multiplied together in the multiplier 2, by which accurate despreading of the spread spectrum signal is performed. The output signal of the multiplier 2 is then supplied through the BPF 8 to the demodulator 9, which demodulates the output signal to obtain the original information signal.

Figure 13:
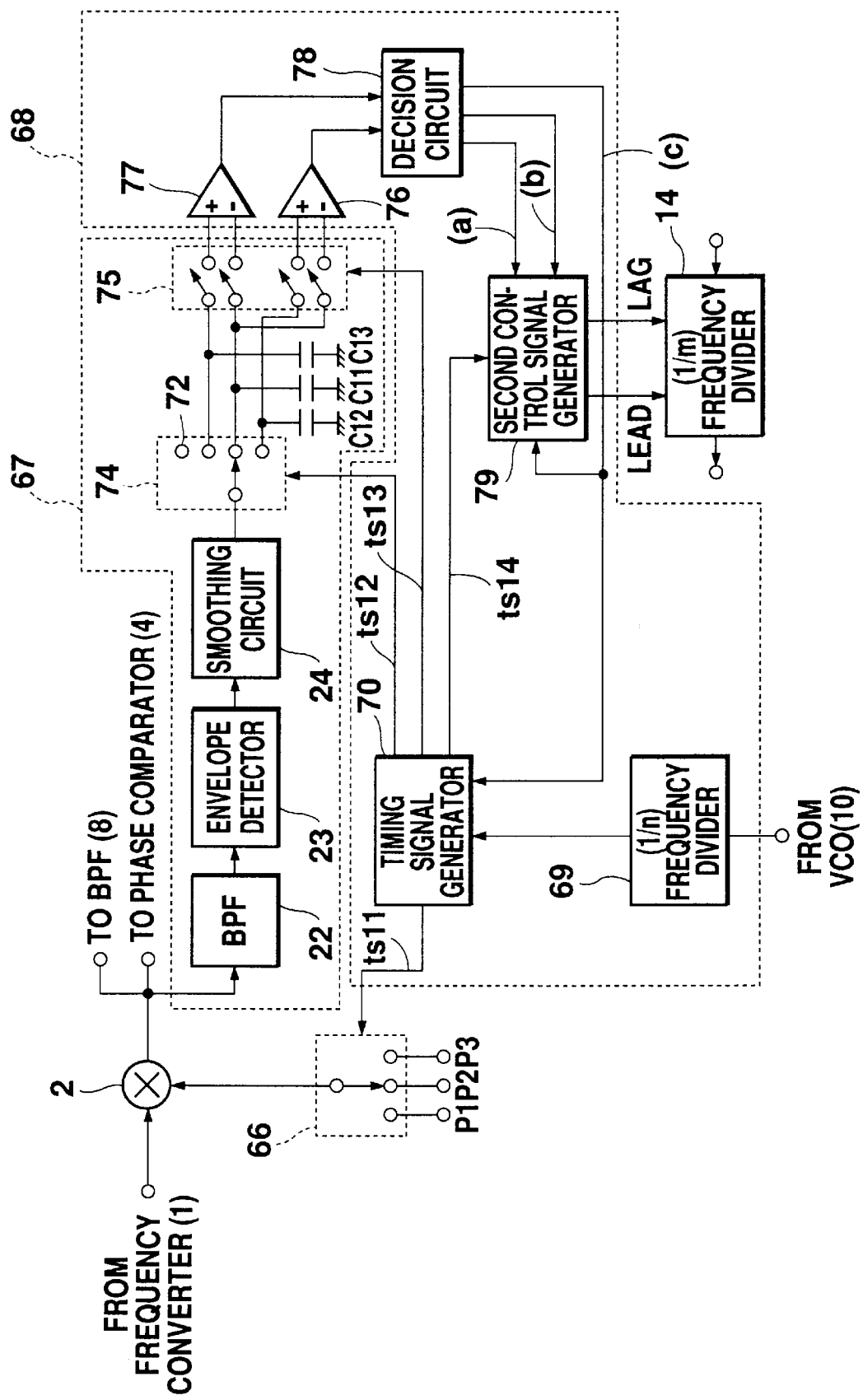
FIG. 13 shows the arrangement of the principal portion of the apparatus in FIG. 12.

FIG. 13 shows an example arrangement of the correlation detector 67 and the control circuit 68 in FIG. 12. In FIG. 13, reference numeral 69 denotes a frequency divider for dividing an output signal of the VCO 10 by n, 70 denotes a timing signal generator for generating timing signals according to the output signal of the frequency divider 69, 22 denotes a BPE for limiting the output signal of the first multiplier 2 to a specified bandwidth, 23 denotes an envelope detector, which acts as a signal level detector, which detects the envelope of the output signal of the BPF 22, 24 denotes a smoothing circuit for smoothing the output signal of the envelope detector 23, 74 denotes a first switch for distributing the output: signal of the smoothing circuit 24 to capacitors C11, C12 and C13, 75 denotes a second switch, 76 denotes a first comparator for comparing the output levels of the capacitors C11 and C12, 77 denotes a second comparator for comparing the output levels of the capacitors C11 and C13, 78 denotes a decision circuit for making a decision according to the output signals of the first and second comparators 76 and 77, and 79 denotes a second control signal generator for generating a second control signal to control the timing of the output of the frequency divider 14. The divisor n for the frequency divider 69 is set to be large enough compared with the divisor m of the frequency divider 14 so that the spreading code selection period in the second selector 66 is longer than at least one spreading code period (one period is the time corresponding to one pattern of a spreading code).

In FIG. 13, the frequency divider 69 divides the output signal of the VCO 10 by n to supply a clock signal to the timing signal generator 70 which generates timing signals ts11 to ts14 in step with the clock signal. In the first period, the second selector 66 is directed to select the first spreading code P1 by the timing signal ts11. By timing signal ts12, the first switch 74 is connected to the capacitor C11, and by timing signal ts13, the second switch 75 is turned off. In this state, the multiplier 2 multiplies the first spreading code P1 and the spread spectrum signal. The output signal of the multiplier 2 is limited to a specified bandwidth by the BPF 22, and output signal of the BPF 22 then has its envelope detected by the envelope detector 23. The envelope detection output signal is a triangular wave signal showing the correlation Vc, between the spread spectrum signal and the spreading code as shown in FIG. 7. The envelope detection output signal is smoothed by the smoothing circuit 24. The correlation data, Vc1, from the smoothing circuit 24 passes through the first switch 74 and is held in capacitor C11.

In the second period, timing signal ts11 switches the second selector 66 to select a second spreading code P2, and by timing signal ts12, the first switch 74 is connected to capacitor C12. Therefore, data showing correlation Vc2 between the second spreading code P2 and the spread spectrum signal, is obtained, and this data, Vc2, passes through the first switch 74 and is held in capacitor C12.

In the third period, timing signal ts11 switches the second selector 66 to select the third spreading code P3, and by timing signal ts12, the movable terminal of the first switch 74 is connected to the capacitor C13. Therefore, correlation Vc3, between the third spreading code P3 and the spread spectrum signal, is obtained, and this data, Vc3, passes through the first switch 74 and is held in capacitor C13.

In the fourth period, timing signal ts11 switches the second selector 66 to select the first spreading code P1, and by timing signal ts12, the first switch 74 is connected to the terminal 72, causing the supply of data showing correlation to the capacitors C11 to C13 to be cut off. At the same time, the switch 75 is turned on by timing signal ts13. Capacitor C12 is connected to the positive input terminal and capacitor C11 is connected to the negative input terminal of the first comparator 76. The first comparator 76 compares the output levels of capacitors C11 and C12, and the second comparator 77 similarity compares the output levels of capacitors C11 and C13. Therefore, the first comparator 76 compares the correlation Vc1 and Vc2 between the first and second spreading codes P1 and P2 and the spread spectrum signal, and the second comparator 77 compares the correlation Vc1 and Vc3 between the first and third spreading codes P1 and P3, and the spread spectrum signal. The first and second comparators 76 and 77 each generate an "H" level output signal, if the output level of the correlation Vc2 or Vc3 from their related capacitor C12 or C13 is higher than the output level of the correlation Vc1 from capacitor C11. The output signals from the first comparator 76 and the second comparator 77 are input to the decision circuit 78 which determines whether the phase of the first spreading code P1 is leading or lagging the phase of the spread spectrum signal. According to the result, the decision circuit 78 supplies decision signals (a), (b) and (c) to the second control signal generator 79, and a decision signal (c) to the timing signal generator 70. When the timing signal generator 70 supplies a timing signal ts14 to the second control signal generator 79, the second control signal generator 79 generates and supplies a "lead" or "lag" second control signal to the frequency divider 14 based on decision signals (a) and (b).

If the first spreading code is lagging the spread spectrum signal, the correlation data, Vc1, Vc2 and Vc3, between the spreading codes P1, P2 and P3 and the spread spectrum signal, correspond to (b), (c) and (a) in FIG. 7, respectively, and the correlation levels are such that Vc2>Vc1>Vc3. Thus, the first comparator 76 generates an "H" level output signal, and the decision circuit 78 generates a decision signal (a). According to the decision signal (a), a "lead" second control signal is generated, which moves the timing of the output of the frequency divider 14 forward. The correlation data, Vc1, Vc2 and Vc3, between the first to third spreading codes P1, P2 and P3, and the spread spectrum signal, then correspond to (c), (d) and (b) in FIG. 7, and the relation remains Vc2>Vc1>Vc3 and the process is repeated. conversely, if the first spreading code P1 is leading the spread spectrum signal, the correlation data, Vc1, Vc2 and Vc3, between the first to third spreading codes P1, P2 and P3, and the spread spectrum signal correspond to (f), (g) and (e) in FIG. 7, respectively, and the correlation levels are such that Vc3>Vc1>Vc2. In this case the second comparator 77 generates an "H" level output signal, and the decision circuit 78 generates a decision signal (b). According to the decision signal (b), a "lag" second control signal is generated, which delays the timing of the output of the frequency divider 14. Consequently, the correlation Vc1, Vc2 and Vc3, between the first to third spreading codes, and the spread spectrum signal, change to (e), (f) and (d) in FIG. 7 and the process is repeated.

By repetition of the above operations, the spreading code and the spread spectrum signal are synchronized. When synchronism is attained, the correlation data, Vc1, Vc2 and Vc3, between the spreading codes P1 to P3 and the spread spectrum signal, correspond to (d), (e) and (c) in FIG. 7, respectively. Their correlation levels become Vc1>Vc2>Vc3, and neither the first comparator 76 nor the second comparator 77 generates an "H" level output signal, so that the decision circuit 78 generates a decision signal (c). According to decision signal (c), the second control signal generator 79 stops generating a second control signal and the timing signal generator 70 generates specified timing signals ts11 to ts13, so that the second selector 66 selects first spreading code P1, the first switch 74 is connected to capacitor C11, and the second switch 75 is fixed on. In this way, the synchronized state between the spreading code, that is, the first spreading code P1, and the spread spectrum signal is maintained.

Further, in this synchronism-locked state, the first comparator 76 constantly compares the correlation Vc1, between the first spreading code P1 and the spread spectrum signal, with the correlation Vc2, of (e) in FIG. 7, which is held in capacitor C12, while the second comparator 77 constantly compares the correlation data Vc1, between the first spreading code P1 and the spread spectrum signal, with the correlation data, Vc3, of (c) in FIG. 7, which is held in capacitor C13. If the spreading code becomes out of phase with the spread spectrum signal, the first comparator 76 or the second comparator 77 generates an "H" level output signal, causing the decision circuit 78 to stop generating decision signal (c). Whereupon, the above-mentioned operation to achieve synchronism between the spreading code and the spread spectrum signal is resumed.

In FIG. 13, the circuit can also be configured such that the output signal of the BPF 22 is input to the demodulator 9, in which case, the BPF 8 can be omitted.

In FIG. 13, the output level of the envelope detector 23 varies minutely and must be smoothed, however, in place of the smoothing circuit 24 in FIG. 13, a minimum value detection circuit may be connected so that the minimum values of data showing correlation between the spreading codes and the spread spectrum signal may be held in holding circuits for comparison purposes when controlling the phase of the spreading code.

Figure 14:
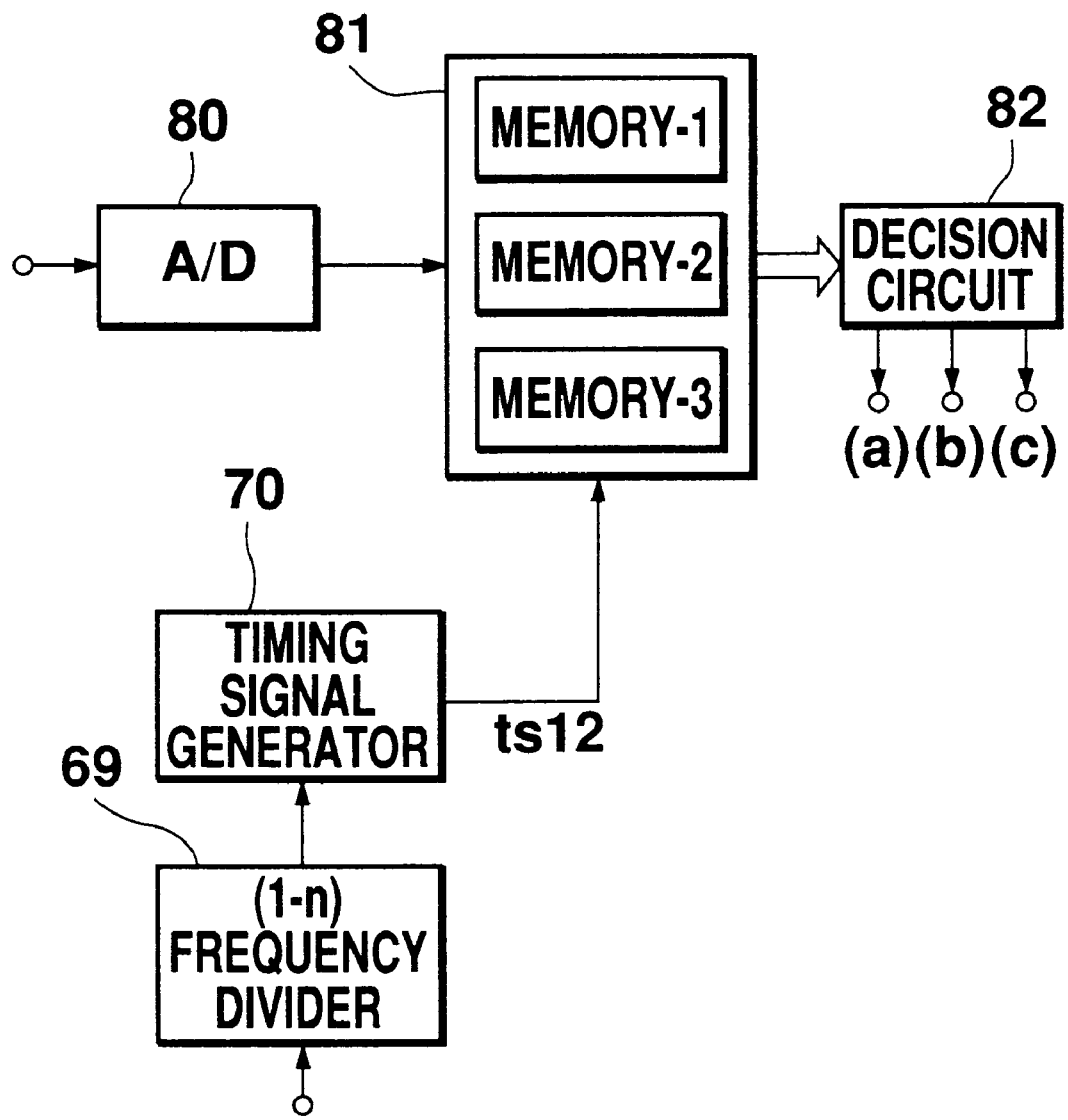
FIG. 14 shows another example of the arrangement of the apparatus in FIG. 13.

FIG. 14 shows an example arrangement which uses memories, in place of the capacitors C11, C12 and C13, as the holding circuits in the circuit arrangement in FIG. 13. In FIG. 14, an A-D converter 80 converts the analog output signal of the smoothing circuit 24 into a digital signal. A memory 81 stores the digital data from the A-D converter 80, and memory-1, memory-2 and memory-3 respectively store the digital correlation data, Vc1, Vc2 and Vc3, between the spreading codes P1 to P3 and the spread spectrum signal, according to timing signal ts12 from the timing signal generator 70. The decision circuit 82 has the same function as the decision circuit 78 in FIG. 13, and compares the three items of output data from the memory 81 to decide whether the spreading codes are leading or lagging the spread spectrum signal. Even though only the embodiments which use capacitors or an A-D converter and memories have been described, this invention may also be accomplished by using other means as the holding circuits.

It should also be noted that shifting the phase of the spreading codes P1 to P3 according to a lead or lag control signal may also be realized by controlling the frequency divider 14 or by controlling the spreading code generator as described with respect to the first embodiment and with reference to FIG. 9.

[Fourth Embodiment]

Figure 15:
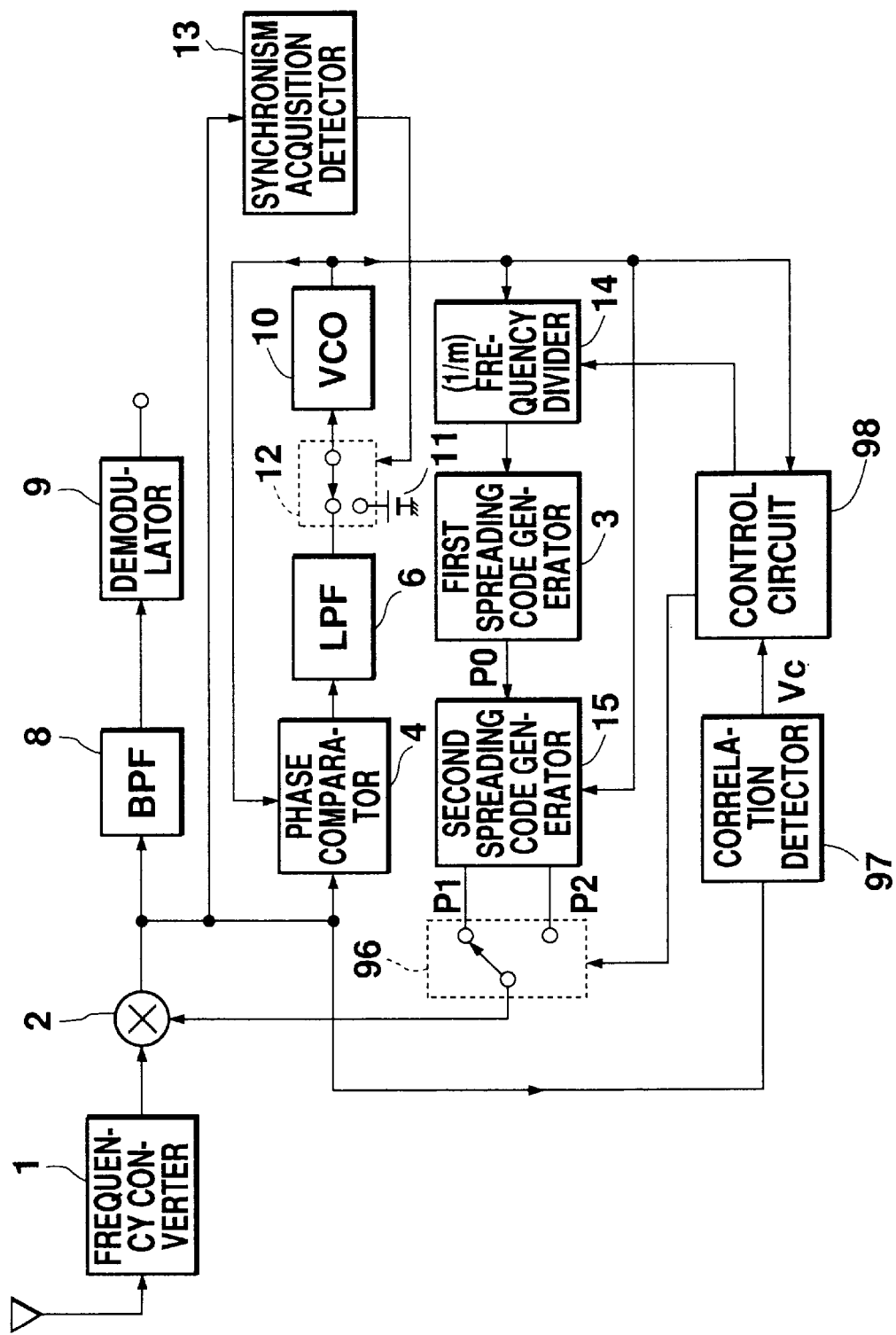
FIG. 15 shows the spread spectrum signal receiving apparatus according to a forth embodiment of the present invention.

FIG. 15 shows a fourth embodiment of the present invention. Those parts which have been described are designated by the same reference numerals and their descriptions are omitted.

In FIG. 15, reference numeral 96 denotes a second selector for selecting either the first spreading code P1 or the second spreading code P2, 97 denotes a correlation detector for detecting the correlation between the spread spectrum signal and the spreading codes in an output signal from the multiplier 2, and 98 denotes a control circuit for controlling the second selector 96, and also for controlling the frequency divider 14 based on the output signals from the correlation detector 97 and the VCO 10.

In the fourth embodiment, like in embodiments one to three, synchronization is acquired by operations designed so that the oscillation frequency of the VCO 10 is set at a desired value.

First the output signal of the VCO 10 is supplied to the control circuit 98, which generates a first control signal accordingly. This first control signal is supplied to the second selector 96 which selects between spreading codes P1 and P2. The multiplier 2 then multiplies the received spread spectrum signal and the selected spreading code together, and using the obtained despread signal, the correlation detector 97 detects the correlation between the spread spectrum signal and the selected spreading code. From the detected correlation data, the control circuit 98 decides whether the phase of the spreading code is leading or lagging the phase of the spread spectrum signal, and generates a second control signal on the basis of the result, and the timing of the output of the frequency divider 14 is varied accordingly.

In this way, a spreading code can be generated which is in phase with the spreading code in the spread spectrum signal, and the spread spectrum signal and the spreading code can be multiplied together in the first multiplier 2 so that the spread spectrum signal is despread to the original bandwidth accurately. The output signal of the first multiplier 2 is then sent through the BPF 8 to the demodulator 9 which demodulates the signal to obtain the original information signal.

Figure 16:
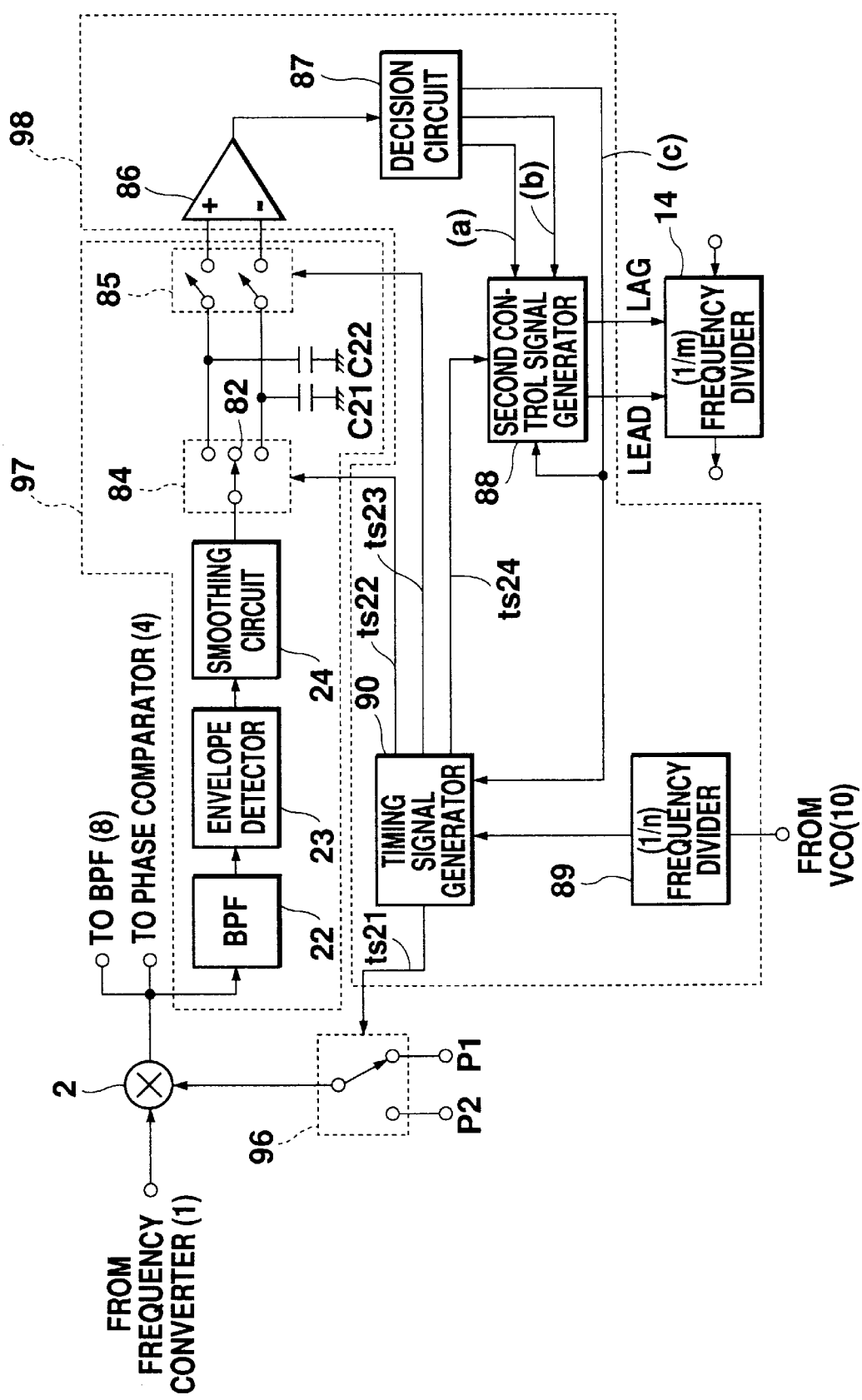
FIG. 16 shows the arrangement of the principal portion of the apparatus in FIG. 15.

FIG. 16 is an example arrangement of the principal components in FIG. 15. Reference numeral 89 denotes a frequency divider for dividing an output signal of the VCO 10 by n, 90 denotes a timing signal generator for generating timing signals according to the output signal of the frequency divider 89, 84 denotes a first switch for distributing the output signal of the smoothing circuit 24 to capacitors 21 and 22, 85 denotes a second switch, 86 denotes a comparator for comparing the output levels of the capacitors 21 and 22, 87 denotes a decision circuit for making a decision according to the output signal of the comparator 86, and 88 denotes a second control signal generator for generating a second control signal to control the timing of the output of the frequency divider 14. The divisor n for the frequency divider 89 is set to be large enough compared with the divisor m so that the spreading code selection period of the second selector 96 is longer than at least one spreading code period.

In FIG. 16, the frequency divider 89 divides the output of the VCO 10 by n to supply a clock signal to the timing signal generator 90, which generates timing signals ts21, ts22, ts23 and ts24 in step with the clock signal. In the first period, timing signal 21 switches the second selector 96 to select a first spreading code P1, timing signal ts22 is set so that the first switch 84 is connected to capacitor 21 and timing signal ts23 is set so that the second switch 85 is turned off. In this state, the multiplier 2 multiplies the first spreading code P1 and the spread spectrum signal together. The output signal of the multiplier 2 is limited to a specified bandwidth by the BPF 22, and then its envelope is detected by the envelope detector 23. The envelope detection output signal shows the correlation between the spread spectrum signal and the spreading code and is a triangular wave signal which is at its highest output level when synchronism is obtained and which is at zero when the phase shift is greater than one bit. The envelope detection output signal is smoothed by the smoothing circuit 24, and the correlation data, Vc1, output from the smoothing circuit 24, passes through the first switch 84 and is held in capacitor C21.

In the second period, timing signal ts21 switches the second selector 96 to select the second spreading code P2, and by timing signal ts22 the first switch 84 is connected to capacitor C22. Therefore, the correlation Vc2, between the second spreading code P2 and the spread spectrum signal, is produced at the output terminal of the smoothing circuit 24, and this data, Vc2 passes through the first switch 84 and is held in capacitor C22.

In the third period, timing signal ts21 switches the second selector 96 to select a first spreading code P1, and timing signal ts22 is set that the first switch 84 is connected to terminal 82, causing the supply of correlation Vc1 and Vc2, to the capacitors C21 and C22 to be cutoff. At the same time, the second switch 85 is turned on by timing signal ts23. Therefore, the comparator 86 compares the output levels of the capacitors C21 and C22, and more specifically, the comparator 86 compares the correlation data, Vc1, for the first spreading code P1 with the correlation data, Vc2, for the second spreading code P2. If the output level of capacitor C22 is higher than the output level of capacitor C21, that is, if correlation levels are Vc2>Vc1, the comparator 86 generates an "H" level output signal. The output signal from comparator 86 is input to the decision circuit 87, which decides whether the phase of the first spreading code P1 is leading or lagging the phase of the spread spectrum signal. According to the result, the decision circuit 87 supplies decision signals (a), (b) or (c) to the second control signal generator 38 and decision signal (c) to the timing signal generator. When it receives timing signal ts24 and one of decision signals (a) or (b), the second control signal generator 88 generates a lead or lag second control signal accordingly.

Figure 17:
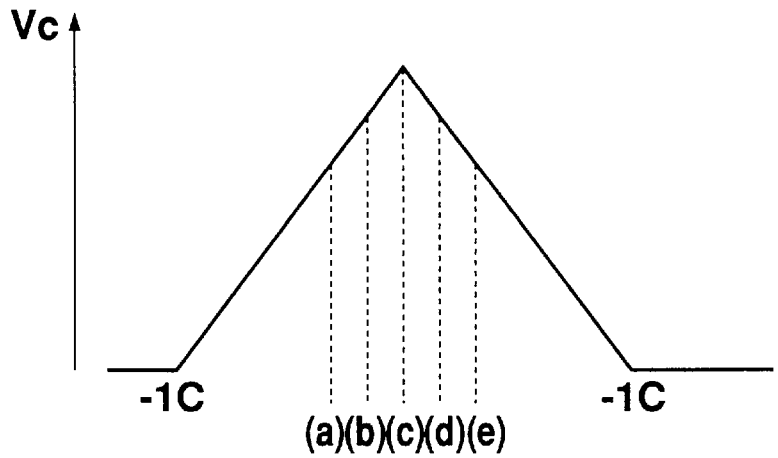
FIG. 17 explains the correlation between the spread spectrum signal and the spreading code in the forth embodiment.

If the first spreading code is lagging the spread spectrum signal, the correlation data, Vc1 and Vc2, between the first and second spreading codes P1 and P2 and the spread spectrum signal, are (a) and (b) in FIG. 17, respectively. Therefore, data showing correlation Vc1 and Vc2 held in the capacitors C21 and C22 are compared by the comparator 86. Since their levels of correlation levels are Vc2>Vc1. Thus, the comparator 86 generates an "H" level output signal, and the decision circuit 87 generates decision signal (a). Based on decision signal (a), a "lead" second control signal is generated, which moves the timing of the output of the frequency divider 14 forward. Thereafter, the correlation data, Vc1 and Vc2, between the first and second spreading codes P1 and P2 and the spread spectrum signal, correspond to (b) and (c) in FIG. 17, respectively. The data showing correlation Vc1 and Vc2 are, like in the above case, held in the capacitors C21 and C22, and compared by the comparator 86, and in response to a "H" level output signal, a "lead" second control signal is generated. The timing of the output of the frequency divider 14 is moved forward, and the correlation data, Vc1 and Vc2, for the first and second spreading codes P1 and P2, correspond to (c) and (d) in FIG. 17, respectively.

At this point, when the correlation data, Vc1 and Vc2, corresponding to (c) and (d) in FIG. 17, are compared, their correlation levels are such that Vc1>Vc2, and the comparator 86 generates an "L" output signal. As the output signal of the comparator 86 changes from "H" to "L", the decision circuit 87 generates decision signals (b) and (c). Based on the decision signal (b), the second control circuit 88 generates a "lag" second control signal, delaying the timing of the output of the frequency circuit 14, and the correlation Vc1 and Vc2, between the first and second spreading codes P1 and P2 and the spread spectrum signal, change to (b) and (c) in FIG. 17, respectively. The decision signal (c) is input to the timing signal generator 90, and accordingly the timing signal circuit 90 generates a timing signal ts21, which causes the second selector 96 to fix on the second spreading code P2. The multiplier 2 then multiplies the second spreading code P2 and the spread spectrum signal together, and since data showing correlation Vc2, corresponds to (c) in FIG. 17, accurate synchronism is attained.

Subsequently, timing signal ts22 is set so that the first switch 84 is connected to capacitor C22, and the correlation data Vc2, which corresponds to the highest level, (c) in FIG. 17, is held in capacitor C22. Next, the first switch 84 is connected to capacitor C21 and timing signal ts23 is set so that the second switch 85 turns on, and the comparator 86 compares current correlation data from the smoothing circuit 24 with the most accurate correlation data held in capacitor C22 in order to detect any loss of synchronism.

Conversely, if the spreading code is leading the spread spectrum signal, the correlation data, Vc1 and Vc2, between the first and second spreading codes P1 and P2 and the spread spectrum signal, correspond to (d) and (e) in FIG. 17 respectively, and their correlation levels are such that Vc1>Vc2. The comparator 86 generates an "L" level output signal, and the decision circuit 87 generates decision signal (b). Based on decision signal (b), the second control signal generator 88 generates a "lag" second control signal, thus delaying the timing of the output of the frequency divider 14. Consequently, the correlation data, Vc1 and Vc2, between the first and second spreading codes P1 and P2 and the spread spectrum signal, change to (c) and (d) in FIG. 17, respectively, and since the correlation levels remain Vc1>Vc2, a "lag" second control signal is generated again, thus delaying the timing of the output of the frequency divider 14 further. At this point, the correlation data, Vc1 and Vc2 for the first and second spreading codes, changes to (b) and (c) in FIG. 17, respectively.

When the correlation data, Vc1 and Vc2, corresponding to (b) and (c) in FIG. 17 are compared, their levels are Vc2>Vc1, and the comparator 86 generates an "H" level output signal, so that the decision circuit 87 generates decision signals (a) and (c). Based on the decision signal (a), the second control signal generator 88 generates a "lead" second control signal, thus moving the timing of the output of the frequency divider 14 forward, such that the correlation data, Vc1 and Vc2, between the first and second spreading codes P1 and P2 and the spread spectrum signal, change to (c) and (d) in FIG. 17, respectively. When decision signal (c) is supplied, the timing signal generator 90 generates a timing signal ts21 which causes the second selector 96 to fix on the first spreading code P1. The first multiplier 2 then multiplies the first spreading code P1 and the spread spectrum signal together, and since the correlation data, Vc1 corresponds to (c) in FIG. 17, accurate synchronism is attained.

Subsequently, timing signal ts22 is set so that the first switch 84 is connected to capacitor C22, and the correlation data, Vc2, which corresponds to the highest level, (c) in FIG. 17, is held in capacitor 22. Next, the first switch 84 is connected to capacitor C21 and timing signal ts23 is set so that the second switch 85 turns on, and the comparator 86 compares data showing correlation Vc1 supplied sequentially to its negative input terminal from the smoothing circuit 24 with the data showing correlation Vc2 of the highest level held in capacitor C22 in order to detect any loss of synchronism.

While synchronism is being monitored, if the spreading code comes out of phase with the spread spectrum signal, the output level of the smoothing circuit 24 becomes lower than the most accurate correlation data held in capacitor C22, and therefore the comparator 86 generates an "H" level output signal. At this point, the decision circuit 87 stops generating the decision signal (c), and operation to acquire synchronism between the spreading code and the spread spectrum signal is resumed.

Note that in FIG. 16, like in the third embodiment, the circuit may be configured such that the output signal of the BPF 22 is input directly to the demodulator 9, in which case the BPF 8 can be removed.

In FIG. 16, the output level of the envelope detector 23 varies minutely and must be smoothed, however, in place of the smoothing circuit 24, a minimum value detection circuit may be connected so that the minimum values of the correlation data between the spreading codes and the spread spectrum signal may be held and compared in order to control the phase of the spreading code.

Figure 18:
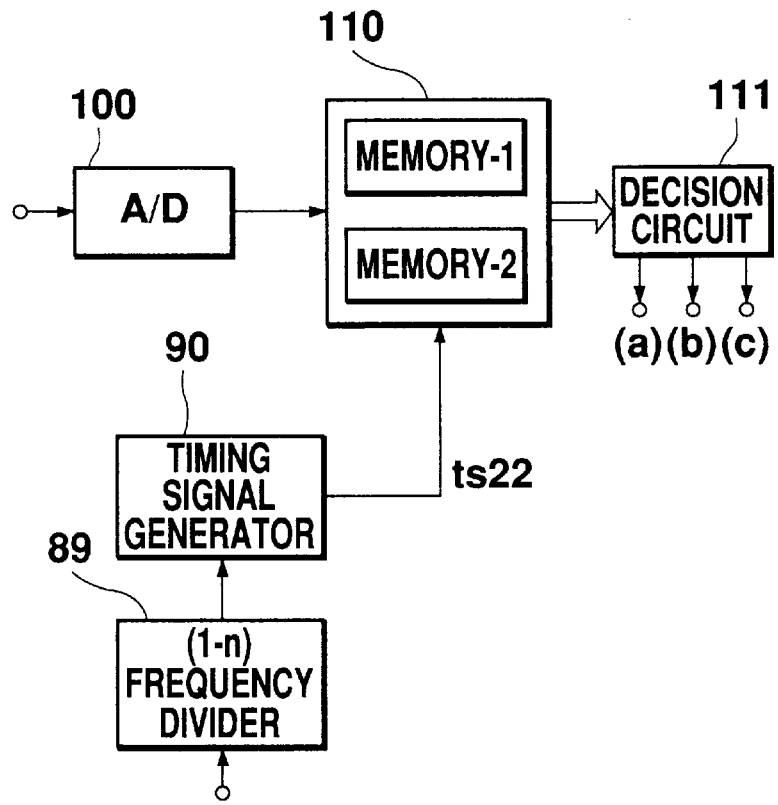
FIG. 18 shows another example of the arrangement of the portion in FIG. 16.

FIG. 18 is an alternative arrangement of the control circuit 68 in FIG. 13, in which memory is used in place of the capacitors C21 and C22 as the holding means in FIG. 16. In FIG. 16, the A-D converter 100 converts the output signal of the smoothing circuit 24 into a digital signal. The memory 110 stores the digital data from the A-D converter 100, and according to a timing signal ts22, the memories 1 and 2 respectively store the digital correlation data, Vc1 and Vc2, between the first and second spreading codes P1 and P2 and the spread spectrum signal. The decision circuit 111 has the same function as the decision circuit 87 in FIG. 16 and compares the two items of output data from the memory 110 and determines whether the spreading code is leading or lagging the spread spectrum signal.

The varying of the timing of the output of the frequency divider 14 according to a lead or lag second control signal from the second control signal generator 88 is the same as in the first embodiment as shown in FIG. 9.

In every arrangement of the first to fourth embodiments, correlation data between the spreading code and the spread spectrum signal is detected, and according to the result, synchronism between the spreading code and the spread spectrum signal is attained, so that the spreading codes on both the transmitter side and the receiver side are synchronized and the spread spectrum signal can be despread to the original bandwidth accurately.

In the process of generating an input signal to the spreading code generator, the timing of the input signal is adjusted to adjust the phase of the spreading code, and thereby the synchronization step is made free from the effects of temperature change, source voltage fluctuations, changes over time, and changes in the free-running frequency of VCO, and despreading of the spread spectrum signal can always be performed accurately. If the phase of the spreading code is adjusted in smaller units than the period of the spreading code chips, synchronism can be achieved with even higher accuracy.

In addition, since the correlation between the spreading code and the spread spectrum signal is detected and held using time division, the circuit can be formed with a simple configuration.

Furthermore, since a single means for despreeading the spread spectrum signal can be used, such as in the fourth embodiment, it is possible to prevent incorrect determinations, which are due to differences in electronic devices, or which are due to offsets resulting from gain errors which may occur when a plurality of despreading means are used, and, it is also possible to simplify the circuit configuration.

While preferred embodiments of the invention, it will be understood that various modifications may be made thereto, and it is intended that the appended claims cover all such modifications as fall within the true spirit and scope of the invention.

We claim:

1. A spread spectrum signal receiving apparatus comprising:

a first despreading circuit for despreading a received spread spectrum signal and generating a first despread signal;

a synchronizing signal generator generating an output signal synchronized with the first despread signal according to the first despread signal obtained through said first despreading circuit;

a shifter for shifting the output signal from the synchronizing signal generator at a unit of one chip or smaller to change an output timing of the output signal and generating a shifter output signal;

a spreading code generator for generating a plurality of spreading codes, each out of phase with one another, according to the shifter output signal from said shifter;

a second despreading circuit for despreading said received spread spectrum signal by said plurality of spreading codes generated by said spreading code generator and generating a second despread signal;

a correlation detector for detecting the correlation between a spreading code contained in said received spread spectrum signal and each of said plurality of spreading codes from the spreading code generator according to the second despread signal obtained by said second despreading circuit to detect whether the plurality of spreading codes lead, lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said output signal from said synchronizing signal generator, at a unit of one chip or smaller according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and in said first despreading circuit, said received spread spectrum signal is despread by said spreading code from the spread code generator synchronized with the spreading code contained in said received spread spectrum signal.

2. A spread spectrum signal receiving apparatus according to claim 1, wherein said spreading code generator generates a first spreading code and at least either of a second spreading code leading the phase of said first spreading code or a third spreading code lagging the phase of said first spreading code.

3. A spread spectrum signal receiving apparatus comprising:

a first despreading circuit for despreading a received spread spectrum signal and generating a first despread signal;

a synchronizing signal generator for generating an output signal synchronized with the first despread signal according to said first despread signal obtained through said first despreading circuit;

a shifter for shifting the output signal from the synchronizing signal generator at a unit of one chip or smaller to change an output timing of the output signal and generating a shifter output signal;

a spreading code generator for generating a plurality of spreading codes, each out of phase with one another, according to the shifter output signal from said shifter;

a second despreading circuit for despreading said received spread spectrum signal by said plurality of spreading codes generated by said spreading code generator and generating a second despread signal;

a correlation detector for detecting the correlation between a spread code contained in said received spread spectrum signal and each of said plurality of spreading codes from the spreading code generator according to the second despread signal obtained by said second despreading circuit to detect whether the plurality of spreading codes lead, lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said spreading codes, generated by said spreading code generator, according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and in said first despreading circuit, said received spread spectrum signal is despread by said spreading code from the spread code generator synchronized with the spreading code contained in said received spread spectrum signal, and wherein said correlation detector including a level detector for detecting the signal levels of said second despread signals output from said second despreading circuit, and a holding circuit for holding level detection signals from said level detector.

4. A spread spectrum signal receiving apparatus according to claim 3, wherein said holding circuit includes capacitor for holding level detection signals from said level detector.

5. A spread spectrum signal receiving apparatus according to claim 3, wherein said holding circuit includes an analog-to-digital converter for converting said level detection signals from said level detector into digital data, and a memory for holding the output data from said analog-to-digital converter.

6. A spread spectrum signal receiving apparatus according to claim 3, wherein said level detector detects the maximum or minimum value of said signal level of said second despread signal from said second despread circuit.

7. A spread spectrum signal receiving apparatus comprising:

a first despreading circuit for despreading a received spread spectrum signal and generating a first despread signal;

a synchronizing signal generator for generating an output signal synchronized with the first despread signal according to said first despread signal obtained through said first despreading circuit;

a shifter for shifting the output signal from the synchronizing signal generator at a unit of one chip or smaller to change an output timing of the output signal and generating a shifter output signal;

a spreading code generator for generating a plurality of spreading codes, each out of phase with one another, according to the shifter output signal from said shifter;

a second despreading circuit for despreading said received spread spectrum signal by said plurality of spreading codes generated by said spreading code generator and generating a second despread signal;

a correlation detector for detecting the correlation between a spread code contained in said received spread spectrum signal and each of said plurality of spreading codes from the spreading code generator according to the second despread signal obtained by said second despreading circuit to detect whether the plurality of spreading codes lead, lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said spreading codes, generated by said spreading code generator, according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and in said first despreading circuit said received spread spectrum signal is despread by said spreading code from the spread code generator synchronized with the spreading code contained in said received spread spectrum signal and wherein said spreading code generator generating a first spreading code and at least one of a second spreading code leading the phase of said first spreading code and a third spreading code lagging the phase of said first spreading code; and a spreading code selector for selectively supplying one of said plurality of spreading codes output from said spreading code generator to said second despreading circuit.

8. A spread spectrum signal receiving apparatus according to claim 7, wherein said spreading code selector is so controlled as to be switched from one spreading code to another by said control circuit.

9. A spread spectrum signal receiving apparatus according to claim 3, wherein said spreading code generator generates a first spreading code, and a second spreading code leading the phase of said first spreading code and a third spreading code lagging the phase of said first spreading code, wherein said holding circuit includes a first holding circuit and a second holding circuit, said first holding circuit holds a level detection signal from said level detector according to said first spreading code, and said second holding circuit selectively holds a level detection signal from said level detector according to said second or third spreading code, and wherein said control circuit compares output signals from said first and second holding circuits, and shifts the phase of said plurality of spreading codes generated by said spreading code generator according to the comparison result.

10. A spread spectrum signal receiving apparatus according to claim 9, wherein when an output signal from said first holding circuit and an output signal from said second holding circuit are compared, the supply of a new level detection signal from said level detector to said first and second holding circuits is selectively cut off.

11. A spread spectrum signal receiving apparatus according to claim 9, wherein said control circuit includes a comparator for comparing an output signal from said first holding circuit and an output signal from said second holding circuit, and a control signal generator for generating a control signal according to the comparison result, wherein said comparator detects the direction of change required for better correlation between said spread spectrum signal and each of said plurality of spreading codes by comparing an output signal from said first holding circuit and an output signal from said second holding circuit, and wherein said control signal generator generates a lead or lag control signal to advance or delay the phase of the plurality of spreading codes generated by said spreading code generator according to the comparison result from said comparator.

12. A spread spectrum signal receiving apparatus according to claim 9, wherein said control circuit compares an output signal from said first holding circuit and an output signal from said second holding circuit, and, such that, when the output signal from said second holding circuit has a higher signal level, it generates a lead control signal to advance the phase of said plurality of spreading codes output from said spreading code generator, and, such that, when the output signal from said first holding circuit has a higher signal level, it generates a lag control signal to delay the phase of said plurality of spreading codes output from said spreading code generator.

13. A spread spectrum signal receiving apparatus comprising:

a first despreading circuit for despreading a received spread spectrum signal by one spreading code and generating a first despread signal;

a synchronizing signal generator generating an output signal synchronized with the first despread signal according to the first despread signal obtained through said first despreading circuit;

a shifter for shifting the output signal from the synchronizing signal generator at a unit of one chip or smaller to change an output timing of the output signal and generating a shifter output signal;

a spreading code generator for generating said one spreading code and another spreading code out of phase with said one spreading code according to the shifter output signal of said shifter;

a second despreading circuit for despreading said received spread spectrum signal by using the other spreading code out of phase with the one spreading code and generating a second despread signal;

a correlation detector for detecting the correlation between said received spread spectrum signal and each of said one spreading code and said other spreading code according to the first and second despread signals obtained from the first and second despreading circuits to detect whether said one and said other spreading codes lead lag or are in synchronism with respect to the spreading code contained in said received spread spectrum signal; and a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said output signal of said synchronizing signal generator at a unit of one chip or smaller according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and in said first despreading circuit, said received spread spectrum signal is despread by said spreading code from the spread code generator synchronized with the spreading code contained in said received spread spectrum signal.

14. A spread spectrum signal receiving apparatus according to claim 13, wherein said spreading code generator generates a first spreading code and at least either a second spreading code leading upon the phase of said first spreading code or a third spreading code lagging upon the phase of said first spreading code according to an output signal from said synchronizing signal generator.

15. A spread spectrum signal receiving apparatus comprising:

a first despreading circuit for despreading a received spread spectrum signal by one spreading code and generating a first despread signal;

a synchronizing signal generator for generating an output signal synchronized with the first despread signal according to said first despread signal obtained by said first despreading circuit;

a shifter for shifting the output signal from the synchronizing signal generator at a unit of one chip or smaller to change an output timing of the output signal and generating a shifter output signal;

a spreading code generator for generating said one spreading code and another spreading code out of phase with said one spreading code according to the shifter output signal of said shifter;

a second despreading circuit for despreading said received spread spectrum signal by using the other spreading code out of phase with the one spreading code and generating a second despread signal;

a correlation detector for detecting the correlation between a spread code contained in said received spread spectrum signal and each of said plurality of spreading codes according to the first and second despread signals obtained from the first and second despreading circuits to detect whether the plurality of spreading codes lead lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said spreading codes generated by said spreading code generator according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and said correlation detector includes a level detector for detecting the signal levels of said first and second despread signals from said first and second despreading circuits.

16. A spread spectrum signal receiving apparatus according to claim 15, wherein said level detector detects the maximum or minimum values of the signal levels of said first and second despread signals.

17. A spread spectrum signal receiving apparatus comprising:

a first despreading circuit for despreading a received spread spectrum signal by one spreading code and generating a first despread signal;

a synchronizing signal generator for generating an output signal synchronized with the first despread signal according to said first despread signal obtained by said first despreading circuit;

a shifter for shifting the output signal from the synchronizing signal generator at a unit of one chip or smaller to change an output timing of the output signal and generating a shifter output signal;

a spreading code generator for generating said one spreading code and another spreading code out of phase with said one spreading code according to the shifter output signal of said shifter;

a second despreading circuit for despreading said received spread spectrum signal by using the other spreading code out of phase with the one spreading code and generating a second despread signal;

a correlation detector for detecting the correlation between a spread code contained in said received spread spectrum signal and each of said plurality of spreading codes according to the first and second despread signals obtained from the first and second despreading circuits to detect whether the plurality of spreading codes lead lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said spreading codes generated by said spreading code generator according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and said spreading code generator generating a first spreading code and at least either a second spreading code leading upon the phase of said first spreading code or a third spreading code lagging upon the phase of said first spreading code according to an output signal from said synchronizing signal generator; and a spreading code selector for selectively supplying said second despreading circuit with said second and third spreading code output from said spreading code generator.

18. A spread spectrum signal receiving apparatus according to claim 17, wherein said spreading code selector is so controlled as to be switched over from one spreading code to another.

19. A spread spectrum signal receiving apparatus according to claim 15,
wherein said spreading code generator generates a first spreading code, and a second spreading code leading the phase of said first spreading code and a third spreading code lagging the phase of said first spreading code according to an output signal from said synchronizing signal generator,
wherein said correlation detector includes a first level detector and a second level detector,
wherein said first level detector detects the signal level of said first despread signal according to said first spreading code output from said first despreading circuit, and said second level detector detects the signal level of said second despread signal obtained according to either of said second or third spreading code output from said second despreading circuit,
and wherein said control circuit compares the level detection signal from said first level detector and the level detection signal from said second level detector, and according to the comparison result, shifts the phase of said spreading code generated by said spreading code generator.

20. A spread spectrum signal receiving apparatus according to claim 19,
wherein said control circuit includes a comparator for comparing the level detection signal from said first level detector and the level detection signal from said second level detector, and a control signal generator for generating a control signal according to the comparison result,
wherein said comparator detects the direction of change of correlation between said spread spectrum signal and each of said plurality of spreading codes by comparing said level detection signal from said first level detector and said level detection signal from said second level detector,
and wherein said control signal generator generates a lead or lag control signal to advance or delay the phase of said spreading codes generated by said spreading code generator according to the comparison result from said comparator.

21. A spread spectrum signal receiving apparatus according to claim 20,
wherein said control circuit compares said level detection signal from said first level detector and said level detection signal from said second level detector, such that when the level detection signal from said second level detector has a higher signal level, generates a lead control signal to advance the phase of said spreading codes generated by said spreading code generator, and when the level detection signal from said first level detector has a higher signal level, generates a lag control signal to delay the phase of said spreading codes generated by said spreading code generator.

22. A spread spectrum signal receiving apparatus comprising:
a despreading circuit for despreading a received spread spectrum signal and generating a despread signal;
a synchronizing signal generator generating an output signal synchronized with the despread signal obtained by said despreading circuit;
a shifter for shifting the output signal from the synchronizing signal generator at a unit of one chip or smaller to change an output timing of the output signal and generating a shifter output signal;
a spreading code generator for generating a plurality of spreading codes, which are out of phase with one another, according to the shifter output signal from said shifter;
a correlation detector for detecting the correlation between a spreading code contained in said received spread spectrum signal and each of said plurality of spreading codes according to a plurality of said despread signals obtained by supplying said despreading circuit with said plurality of spreading codes output from said spreading code generator to detect whether the plurality of spreading codes lead, lag or are in synchronism with respect to the spreading code contained in said received spread spectrum signal; and
a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said output signal from said synchronizing signal generator, at a unit of one chip or smaller according to an output signal from said correlation detector; wherein
the shifter delays the output timing according to the lag control signal to delay a phase of the output signal from the synchronizing signal generator and advances the output timing according to the lead control signal to advance a phase of the output signal from the synchronizing signal generator; and
in said despreading circuit, said spread spectrum signal is despread by said synchronized spreading code synchronized with said spread spectrum signal.

23. A spread spectrum signal receiving apparatus according to claim 22,
wherein said spreading code generator generates a first spreading code and at least either of a second spreading code leading the phase of said first spreading code or a third spreading code lagging the phase of said first spreading code.

24. A spread spectrum signal receiving apparatus comprising:
a despreading circuit for despreading a received spread spectrum signal and generating a despread signal;
a synchronizing signal generator for generating an output signal synchronized with the phase of a despread signal obtained by said despreading circuit according to the despread signal obtained through said despreading circuit;
a shifter for shifting the output signal from the synchronizing signal generator at a unit of one chip or smaller to change an output timing of the output signal and generating a shifter output signal;
a spreading code generator for generating a plurality of spreading codes, which are out of phase with one another, according to shifter output signal from said shifter;
a correlation detector for detecting the correlation between a spreading code contained in said received spread spectrum signal and each of said plurality of spreading codes according to a plurality of said despread signals obtained by supplying said despreading circuit with said plurality of spreading codes output from said spreading code generator to detect whether the plurality of spreading codes lead, lag or are in synchronism with respect to the spreading code contained in said received spread spectrum; and a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phrase of said spreading codes generated by said spreading code generator according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and said correlation detector including a level detector for detecting the signal level of said despread signal output from said despreading circuit, and a holding circuit for holding said level detection signal from said level detector.

25. A spread spectrum signal receiving apparatus according to claim 24, wherein said holding circuit includes a capacitor means for holding said level detection signal from said level detector.

26. A spread spectrum signal receiving apparatus according to claim 24, wherein said holding circuit includes an analog-to-digital converter for converting said level detection signal from said level detector into digital data, and a memory for holding the output data from said analog-to-digital converter.

27. A spread spectrum signal receiving apparatus according to claim 24, wherein said level detector detects a maximum or minimum value of the signal level of a despread signal from said despreading circuit.

28. A spread spectrum signal receiving apparatus according to claim 23, further comprising a spreading code selector for selectively supplying said second despreading circuit with said plurality of spreading codes output from said spreading code generator.

29. A spread spectrum signal receiving apparatus according to claim 28, wherein said spreading code selector is so controlled as to be switchable from one spreading code to another.

30. A spread spectrum signal receiving apparatus according to claim 24, wherein said spreading code generator generates a first spreading code, and a second spreading code leading the phase of said first spreading code and a third spreading code lagging the phase of said first spreading code, wherein a holding circuit includes first, second and third holding circuits, said first holding circuit holds a level detection signal from said level detector according to said first spreading code, said second holding circuit holds a level detection signal from said level detector according to said second spreading code, and said third holding circuit holds a level detection signal from level detector according to said third spreading code.

31. A spread spectrum signal receiving apparatus according to claim 30, wherein said control circuit includes a first comparator for comparing the output signal from said first holding circuit and the output signal from said second holding circuit, a second comparator for comparing the output signal from said first holding circuit and the output signal from said third holding circuit, and a control signal generator for generating a control signal according to the result of a comparison between said first and second comparators, wherein said first and second comparators detect the direction of change of correlation between said spread spectrum signal and each of said plurality of spreading codes on the basis of a comparison between the output signal from said first holding circuit and the output signal from said second holding circuit and also a comparison between the output signal from said first holding circuit and the output signal from said third holding circuit, and wherein said control signal generator generates a lead or lag control signal to advance or delay the phase of said plurality of spreading codes generated by said spreading code generator.

32. A spread spectrum signal receiving apparatus according to claim 31, wherein said control circuit compares the output signal from said first holding circuit and the output signal from said second holding circuit, and if said output signal from said second holding circuit has a higher signal level, said control circuit generates a lead control signal to advance the phase of said plurality of spreading codes, and said control circuit compares the output signal from said first holding circuit and the output signal from said third holding circuit, and if said output signal from said third holding circuit has a higher signal level, said control circuit generates a lag control signal to delay the phase of said plurality of spreading codes generated by said spreading code generator.

33. A spread spectrum signal receiving apparatus according to claim 31, wherein in either of said first or second comparator, when the output signal from said first holding circuit has a higher signal level than the output signal from said other holding circuit, said lead or lag control signal will be prevented from being output to vary the phase of said spreading codes, after output of said lead or lag control signal has been prevented, if the output signal from said first holding circuit is found to have a lower signal level than the output signals from said other holding circuits, the prevention of output of said lead or lag control signal is released, and said control circuit generates said lead or lag control signal accordingly.

34. A spread spectrum signal receiving apparatus according to claim 24, wherein said spreading code generator, according to an output signal from said synchronizing signal, generates a first spreading code and a second spreading code, which is out of phase by a specified amount from said first spreading code, wherein a holding circuit includes a first holding circuit and a second holding circuit, said first holding circuit holds a level detection signal from said level detector according to said first spreading code, and said second holding circuit holds a level detection signal from said level detector according to said second spreading code.

35. A spread spectrum signal receiving apparatus according to claim 34, wherein said control circuit includes a comparator for comparing the output from said first holding circuit and the output signal from said second holding circuit and a control signal generator for generating a control signal according to the comparison result in said comparator, wherein said comparator detects the direction of change of correlation between said spread spectrum signal and each of said plurality of spreading codes according to the comparison result between the output signal from said first holding circuit and the output signal from said second holding circuit, and wherein said control signal generator generates a lead or lag control signal to advance or delay the phase of said spreading codes output from said spreading code generator.

36. A spread spectrum signal receiving apparatus according to claim 35, wherein said control circuit compares the output signal from said first holding circuit and the output signal from said second holding circuit, and when the output signal from said second holding circuit has a higher signal level, generates a lead control signal to advance the phase of said plurality of spreading codes generated by said spreading code generator, and when the output signal from said second holding circuit has a lower signal level, generates a lag control signal to delay the phase of said plurality of spreading codes generated by said spreading code generator.

37. A spread spectrum signal receiving apparatus according to claim 35, wherein when synchronism between said spread spectrum signal and said spreading code has been established, the signal level from said level detector which has the maximum level is held in one of said first and second holding circuits, and said comparator continuously compares the signal level of the held level detection signal and the signal level of the level detection signal obtained according to the current despread signal from despreading circuit, and if said level signal according to said current despread signal, obtained by sequential despreading, has a lower signal level than said held level detection signal, said control signal generator detects the direction of change required for better correlation between said spread spectrum signal and said plurality of spreading codes, and generates a lead or lag control signal to advance or delay the phase of said plurality of spreading codes generated by said spreading code generator on the basis of the comparison result, from said comparator.

38. A spread spectrum signal receiving apparatus according to claim 34, further comprising a clock signal generator for generating a clock signal according to the output signal of the phase synchronizing circuit, wherein the spreading code generator generates the plurality of spreading codes in step with the clock signal, and wherein the control circuit shifts the phase of the clock signal and also shifts the phase of the spreading codes generated by the spreading code generator according to said output signals from the correlation detector.

39. A spread spectrum signal receiving apparatus according to claim 38, wherein said control circuit comprises a comparator and a control signal generator, wherein said comparator detects the direction of change required for better correlation between said received spread spectrum signal and each of said plurality of spreading codes according to an output signal from said correlation detector, and wherein said control signal generator generates a lead or lag control signal to advance or delay the phase of said clock signal according to the output signal of said comparator.

40. A spread spectrum signal receiving apparatus comprising:

a despreading circuit for despreading a received spread spectrum signal and generating a despread signal;

a synchronizing signal generator generating an output signal synchronized with the despread signal from said despeding circuit according to the despread signal obtained through said despreading circuit;

a shifter for shifting the output signal from the synchronizing signal generator at a unit of one chip or smaller to change an output timing of the output signal and generating a shifter output signal;

a spreading code generator for generating and supplying a plurality of spreading codes to said despreading circuit on the basis of the shifter output signal from said shifter;

a correlation detector for detecting the correlation between a spreading code contained in said received spread spectrum signal and each of said plurality of spreading codes from the spreading code generator to detect whether the plurality of spreading codes lead, lag or are in synchronism with respect to the spreading code contained in said received spread spectrum signal; and a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said output signal from said synchronizing signal generator, at a unit of one chip or smaller according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator; and in said despreading circuit, said spread spectrum signal is despread by a synchronized spreading code.

41. A spread spectrum signal receiving apparatus comprising:

a despreading circuit for despreading a received spread spectrum signal and generating a despread signal;

a synchronizing signal generator for generating an output signal synchronized with the despread signal from said despreading circuit according to the despread signal obtained through said despreading circuit;

a shifter for shifting the output signal from the synchronizing signal generator at a unit of one chip or smaller to change an output timing of the output signal and generating a shifter output signal;

a spreading code generator for generating a plurality of spreading codes on the basis of the shifter output signal from said shifter;

a correlation detector for detecting the correlation between a spreading code contained in said received spread spectrum signal and each of said plurality of spreading codes from the spreading code generator to detect whether the plurality of spreading codes lead, lag or are in synchronism with respect to the spreading code contained in said received spread spectrum signal;

a control circuit for generating a lead control signal when the spreading code from the spreading code generator lags with respect to the spreading code contained in the spread spectrum signal and for generating a lag control signal when the spreading code of the spreading code generator leads the spreading code of the spread spectrum signal to shift the phase of said spreading codes, generated by said spreading code generator, according to an output signal from said correlation detector; wherein the shifter delays the output timing according to the lag control signal to delay a phase of the output signal from the synchronizing signal generator and advances the output timing according to the lead control signal to advance a phase of the output signal from the synchronizing signal generator;

said control circuit comprising a comparator and a control signal generator;

said comparator detecting the direction of change required for better correlation between said received spread spectrum signal and each of said plurality of spreading codes according to an output signal from said correlation detector; and said control signal generator generating a lead or lag control signal to advance or delay the phase of said spreading codes according to the output signal of said comparator.

42. A spread spectrum signal receiving apparatus according to claim 41, wherein said correlation detector includes a despreading circuit which is used for correlation detection and by despreading said spread spectrum signal by said plurality of spreading codes, a level detector for detecting the level of an output signal from said despreading circuit for correlation detection, and a holding circuit for holding an output signal from said level detector.

43. A spread spectrum signal receiving apparatus according to claim 42, wherein said spreading code generator, in step with an output signal from said synchronizing signal generator, generates a first spreading code, a second spreading code leading the phase of said first spreading code and a third spreading code lagging the phase of said first spreading code, wherein said holding circuit includes a first holding circuit for holding the output signal of said level detector according to said first spreading code, and a second holding circuit for alternately holding the output signal from said level detector according to said second spreading code or said third spreading code, and wherein said comparator compares the output signals from said first and second holding circuits to detect said direction of change of correlation.

44. A spread spectrum signal receiving apparatus according to claim 43, wherein, when said second holding circuit holds an output signal from said level detector according to said second spreading code, if the output signal from said second holding circuit is greater than the output signal from said first holding circuit, said control signal generator generates said lead control signal, and wherein, when said second holding circuit holds an output signal from said level detector according to said third spreading code, if the output signal from said second holding circuit is greater than the output signal from said first holding circuit, said control signal generator generates said lag control signal.

45. A spread spectrum signal receiving apparatus of claim 1, wherein the shifter comprises a frequency divider circuit having at least one frequency divider stage, an initial stage of the frequency divider stage being cleared in response to the lead control signal to achieve an earlier output timing and preset in response to the lag control signal to achieve a delayed output timing.

46. A spread spectrum signal receiving apparatus of claim 13, wherein the shifter comprises a frequency divider circuit having at least one frequency divider stage, an initial stage of the frequency divider stage being cleared in response to the lead control signal to achieve an earlier output timing and preset in response to the lag control signal to achieve a delayed output timing.

47. A spread spectrum signal receiving apparatus of claim 22, wherein the shifter comprises a frequency divider circuit having at least one frequency divider stage, an initial stage of the frequency divider stage being cleared in response to the lead control signal to achieve an earlier output timing and preset in response to the lag control signal to achieve a delayed output timing.

* * * * *